US009009383B2

(12) United States Patent
Hendry et al.

(10) Patent No.: US 9,009,383 B2
(45) Date of Patent: Apr. 14, 2015

(54) MEMORY CONTROLLER MAPPING ON-THE-FLY

(71) Applicant: Apple Inc., Cupertino, CA (US)

(72) Inventors: Ian C. Hendry, San Jose, CA (US); Rajabali Koduri, Santa Clara, CA (US); Jeffry E. Gonion, Campbell, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/331,336

(22) Filed: Jul. 15, 2014

(65) Prior Publication Data
US 2014/0325173 A1 Oct. 30, 2014

Related U.S. Application Data

(62) Division of application No. 12/895,689, filed on Sep. 30, 2010, now Pat. No. 8,799,553.

(60) Provisional application No. 61/323,753, filed on Apr. 13, 2010.

(51) Int. Cl.
G06F 12/00 (2006.01)
G06F 3/06 (2006.01)
(Continued)

(52) U.S. Cl.
CPC ............ *G06F 3/0647* (2013.01); *G06F 1/3203* (2013.01); *G06F 1/3225* (2013.01); *G06F 1/3275* (2013.01); *G06F 12/0292* (2013.01); *Y02B 60/1225* (2013.01); *Y02B 60/32* (2013.01); *G06F 12/06* (2013.01); *G06F 12/0646* (2013.01); *G06F 17/30147* (2013.01); *G06F 3/0625* (2013.01); *G06F 3/065* (2013.01); *G06F 3/0673* (2013.01); *G06F 3/0604* (2013.01);
(Continued)

(58) Field of Classification Search
CPC .... G06F 1/3275; G06F 1/3287; G06F 17/30147
USPC ...................... 711/7, 100, 173, 202
See application file for complete search history.

(56) References Cited

U.S. PATENT DOCUMENTS 5,813,022 A * 9/1998 Ramsey et al. ............... 711/3
6,535,959 B1 * 3/2003 Ramprasad et al. ........ 711/125
(Continued)

OTHER PUBLICATIONS

Notice of Allowance from Korean Application No. 10-2012-7029643, issued Oct. 16, 2014, pp. 1-10.
(Continued)

*Primary Examiner* — Tuan Thai
(74) *Attorney, Agent, or Firm* — Meyertons, Hood, Kivlin, Kowert & Goetzel, P.C.

(57) ABSTRACT

Systems, methods, and devices for dynamically mapping and remapping memory when a portion of memory is activated or deactivated are provided. In accordance with an embodiment, an electronic device may include several memory banks, one or more processors, and a memory controller. The memory banks may store data in hardware memory locations and may be independently deactivated. The processors may request the data using physical memory addresses, and the memory controller may translate the physical addresses to hardware memory locations. The memory controller may use a first memory mapping function when a first number of memory banks is active and a second memory mapping function when a second number is active. When one of the memory banks is to be deactivated, the memory controller may copy data from only the memory bank that is to be deactivated to the active remainder of memory banks.

20 Claims, 14 Drawing Sheets

(51) Int. Cl.
*G06F 1/32* (2006.01)
*G06F 12/02* (2006.01)
*G06F 12/06* (2006.01)
*G06F 17/30* (2006.01)
*G06F 12/08* (2006.01)

(52) U.S. Cl.
CPC ........ *G06F 12/08* (2013.01); *G06F 2003/0697* (2013.01)

(56) References Cited

U.S. PATENT DOCUMENTS

| | | | |
|---|---|---|---|
| 6,920,523 B2 * | 7/2005 | Le et al. | 711/106 |
| 7,010,656 B2 * | 3/2006 | Gupta | 711/165 |
| 7,081,897 B2 * | 7/2006 | Garg | 345/543 |
| 7,100,013 B1 * | 8/2006 | de Waal | 711/170 |
| 7,318,114 B1 | 1/2008 | Cypher | |
| 7,590,815 B1 * | 9/2009 | de Waal | 711/170 |
| 7,752,470 B2 * | 7/2010 | Huang et al. | 713/310 |
| 7,788,513 B2 | 8/2010 | Vaden | |
| 8,010,764 B2 * | 8/2011 | Keller et al. | 711/165 |
| 8,045,411 B2 * | 10/2011 | Kim et al. | 365/211 |
| 8,108,629 B2 * | 1/2012 | Shimizu et al. | 711/154 |
| 8,364,995 B2 | 1/2013 | Huizenga | |
| 8,392,736 B2 | 3/2013 | Vaden | |
| 8,412,972 B2 * | 4/2013 | Cheung et al. | 713/340 |
| 8,639,874 B2 | 1/2014 | Maule | |
| 2008/0005516 A1 | 1/2008 | Meinschein | |
| 2008/0059820 A1 | 3/2008 | Vaden et al. | |
| 2009/0083561 A1 | 3/2009 | Kaburlasos | |

OTHER PUBLICATIONS

Notice of Final Rejection from Korean Patent Application No. 10-2012-7029643, issued Jul. 7, 2014, English and Korean versions, pp. 1-11.

Office Action from Chinese Application No. 201180023741.6, mailed Nov. 15, 2014, English and Chinese versions, pp. 1-42.

* cited by examiner

FIG. 4
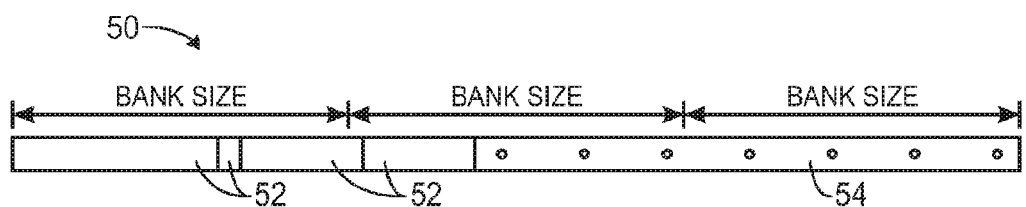
FIG. 5
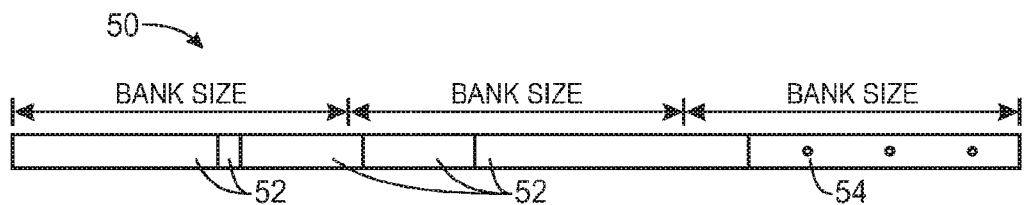
FIG. 6

MEMORY CONTROLLER MAPPING ON-THE-FLY

CROSS-REFERENCE TO RELATED APPLICATIONS

This application is a divisional of U.S. patent application Ser. No. 12/895,689, filed Sep. 30, 2010, which claims benefit of Provisional Application Ser. No. 61/323,753, filed Apr. 13, 2010, entitled "MEMORY CONTROLLER MAPPING ON-THE-FLY," which is incorporated by reference herein in its entirety.

BACKGROUND

Embodiments described herein are related to the field of memory management techniques and, more particularly, to techniques for memory mapping on-the-fly.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as portable and desktop computers, increasingly employ greater quantities of memory for high performance graphics and other features. In many cases, large portions of the memory may sit idle at a given time, since such large portions of memory may be in use only during memory-intensive operations, such as rending high-performance graphics. However, even while idle, the memory and accompanying circuitry may consume power.

Various techniques have been developed to reduce the power consumption of idle memory devices. For example, depending on the performance needs of the electronic device, memory and/or memory buses may be clocked at a lower frequency, but may continue to draw operating power. Moreover, while certain techniques may involve shutting down power to one or more memory devices of a portable electronic device to conserve power, these techniques do not provide on-the-fly memory remapping and/or may inefficiently copy data from the powered down memory to the memory that remains. Instead, these techniques may employ inefficient memory mapping structures, such as translation lookaside buffers (TLBs), and/or may involve copying data from various portions of the memory other than the portion that is to be powered down.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for dynamically mapping and remapping memory when a portion of memory is activated or deactivated. In accordance with one embodiment, an electronic device may include several memory banks, one or more processors, and a memory controller. The memory banks may store data in hardware memory locations and may be independently deactivated. The processors may request the data using physical memory addresses, and the memory controller may translate the physical addresses to the hardware memory locations. The memory controller may use a first memory mapping function when a first number of memory banks is active and a second memory mapping function when a second number is active. When one of the memory banks is to be deactivated, the memory controller may copy data from only the memory bank that is to be deactivated to the active remainder of memory banks.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is a schematic diagram of a process for dynamic memory mapping across three banks of memory, in accordance with an embodiment;

FIGS. 5 and 6 are memory allocation diagrams, in accordance with embodiments;

DETAILED DESCRIPTION OF SPECIFIC EMBODIMENTS

Figure 1:
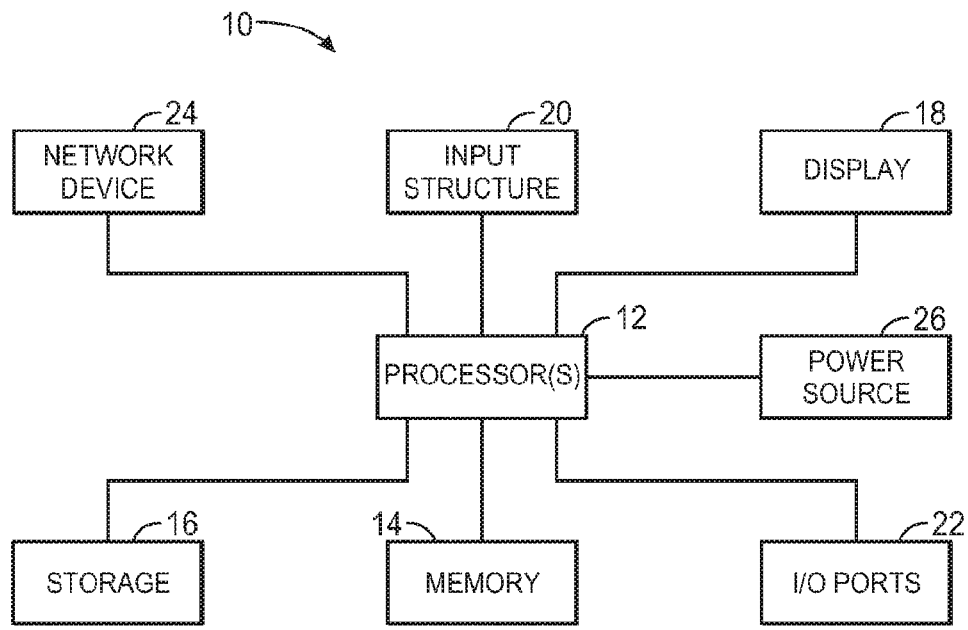
FIG. 1 is a block diagram of an electronic device configured to perform the techniques disclosed herein, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to power and memory management for an electronic device. In particular, the present disclosure describes techniques for memory mapping and remapping on-the-fly and for powering up or down one or more portions of total memory, which may be, in certain embodiments, one or more memory banks. As used herein, the terms "power down", "shut down", and "deactivate" refer to placing memory into any low power condition, such as turning off the memory, placing the memory in a self-refresh mode, or setting the memory to any other lower-power-consumption mode. Among other things, the presently-disclosed techniques describe a manner of on-the-fly memory remapping when a portion of the available memory is powered down using certain disclosed mapping functions. For example, in certain embodiments, an electronic device may have three banks of memory, each of which may have a particular memory bus. When a higher level of performance is desired, a memory controller may map certain physical addresses to hardware memory locations (also referred to herein as "storage cells" or "dual in-line memory module (DIMM) addresses") distributed approximately evenly across all three memory banks. It should be appreciated that the term "physical address," as used herein, refers to a memory chunk that is manipulable by the memory controller and may be any suitable size. For example, when the term "physical address" is used in reference to mapping or remapping memory, the term may refer to cache lines or pages of memory that are mapped or remapped, even if the memory controller is capable of manipulating smaller chunks. That is, in some embodiments, the term "physical address," when used in reference to the disclosure herein, may refer to the remapping of pages of memory, even though cache lines of the pages may be individually accessible through the memory controller. When data associated with the physical addresses is accessed, the data may be transmitted with a maximized bandwidth over all three memory buses at once.

In such an embodiment, when power conservation is desired, alternatively or in addition to simply reducing the clock frequency of the memory banks and/or memory buses, one or more of the memory banks and/or buses may be powered down (e.g., turned off, placed in a self-refresh mode, placed in a lower power consumption mode, etc.). The memory controller may remap, on-the-fly, the remaining physical addresses to DIMM addresses on the first two memory banks via a mathematical memory mapping function. Before shutting down the third memory bank, the memory controller may copy data associated with the remapped physical addresses directly from the third memory bank to the first two memory banks. To that end, in some embodiments, no data may be copied from the first memory bank to the second memory bank, or from the second memory bank to the first memory bank, during the remapping process. After the data from the third memory bank has been copied to the first two memory banks, the memory controller may cause the third memory bank and/or memory bus to be shut down. It should be understood that the present techniques may also be applied to any number of memory banks and/or portions of the total memory.

Figure 2:
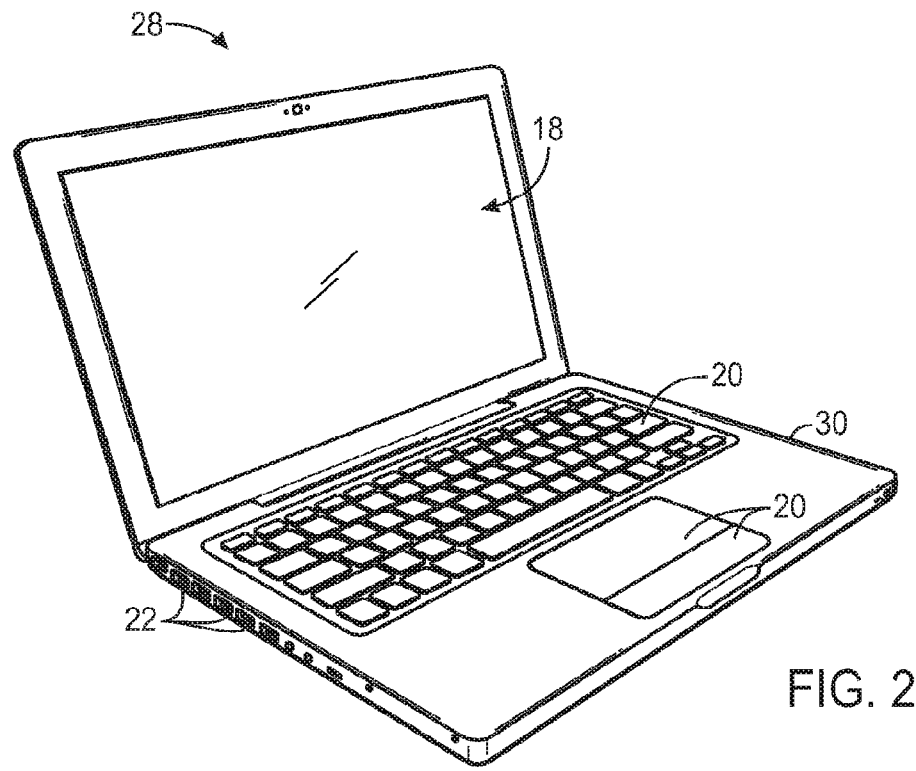
FIG. 2 is a perspective view of an embodiment of the electronic device of FIG. 1 in the form of a notebook computer.

With the foregoing in mind, a general description of suitable electronic devices capable of using the disclosed memory management techniques is provided below. In FIG. 1, a block diagram depicting various components that may be present in electronic devices suitable for use with the present techniques is provided. In FIG. 2, one example of a suitable electronic device, here provided as a notebook computer system, is depicted. These types of electronic devices, and other electronic devices having comparable memory management capabilities, may be used in conjunction with the present techniques.

FIG. 1 is a block diagram illustrating various components and features of an electronic device 10 capable of performing the techniques disclosed herein. In the presently illustrated embodiment, such components may include one or more processor(s) 12, memory 14, nonvolatile storage 16, a display 18, input structures 20, input/output (I/O) ports 22, a networking device 24, and a power source 26. The various functional blocks shown in FIG. 1 may include hardware elements (including circuitry), software elements (including computer code stored on a non-transitory computer-readable medium) or a combination of both hardware and software elements. It should further be noted that FIG. 1 is merely one example of a particular implementation and is intended to illustrate the types of components that may be present in electronic device 10.

The processor(s) 12 may enable the operation of an operating system (OS), which itself may enable the use of various software to temporarily store information in the volatile memory 14. In particular, the OS running on the processor(s) 12 may operate using logical memory addresses that may be translated by the processor(s) 12 into physical addresses, and the processor(s) 12 may request certain memory operations by the memory 14 based on these physical addresses. As discussed in greater detail below, when the memory 14 receives the physical addresses from the processor(s) 12, a memory controller of the memory 14 may translate the physical addresses to hardware memory locations of any suitable size (e.g., lines or pages), such as dual inline memory module (DIMM) addresses, for example. The DIMM addresses may represent the actual, physical location of the stored data to which the physical addresses, and thus also the logical addresses, correspond. Also as discussed in greater detail below, the memory 14 may be capable of power conservation by reducing the number of operational DIMMs by approximately one-third or more and remapping, on-the-fly, the correspondence of the remaining physical addresses to the remaining DIMM addresses. The number of operational DIMMs may be reduced further, in which case the remaining physical addresses also may be remapped to the remaining DIMM addresses.

The memory 14 may store instructions for carrying out certain aspects of the present techniques described herein. For example, the OS running on the processors 12 and/or software running on the OS may perform certain algorithms relating to the present techniques (e.g., when to enter a low-power mode, etc.). The instructions for carrying out these instructions may be stored, at least temporarily, in the memory 14. Such instructions may also be stored in the nonvolatile storage 16, which may include, for example, a hard disk drive or Flash memory. The display 18 may display elements of the OS or software, such as the user interface (UI) of the electronic device 10. A user may interact with the electronic device 10 via the input structures 20, which may include a keyboard and/or a mouse or touchpad. In certain embodiments, the display 18 may be a touchscreen display that serves as one of the input structures 20.

The I/O ports 22 of the electronic device 10 may enable the electronic device 10 to transmit data to and receive data from other electronic devices 10 and/or various peripheral devices, such as external keyboards or mice. The networking device 24 may enable personal area network (PAN) integration (e.g., Bluetooth), local area network (LAN) integration (e.g., Wi-Fi), and/or wide area network (WAN) integration (e.g., cellular 3G or 4G). The power source 26 of the electronic device 10 may be any suitable source of power, such as a rechargeable lithium polymer (Li-poly) battery and/or standard alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. In other embodiments, the electronic device 10 may take the form of a handheld or tablet device, such as a model of an iPod®, iPhone®, or iPad® available from Apple Inc.

By way of example, the electronic device 10, taking the form of a notebook computer 28, is illustrated in FIG. 2 in accordance with one embodiment of the present disclosure. The depicted computer 28 may include a housing 30, a display 18, input structures 20, and I/O ports 22. In one embodiment, the input structures 20 (such as a keyboard and/or touchpad) may be used to interact with the computer 28, such as to start, control, or operate a GUI or applications running on computer 28. For example, a keyboard and/or touchpad may allow a user to navigate a user interface or application interface displayed on the display 18.

In some embodiments, the electronic device 10 may be capable of displaying high-performance graphics on the display 18, which may involve accessing large quantities of the memory 14 at high bandwidths at certain times. However, at other times, the electronic device 10 may not significantly benefit from such large amounts of the memory 14 or such high bandwidths. As such, the electronic device 10 may include a memory management system 34, illustrated in FIG. 3, which may enable certain parts of the memory 14 to be shut down (e.g., turned off, placed in a self-refresh mode, placed in a lower power consumption mode, etc.) to conserve power.

Figure 3:
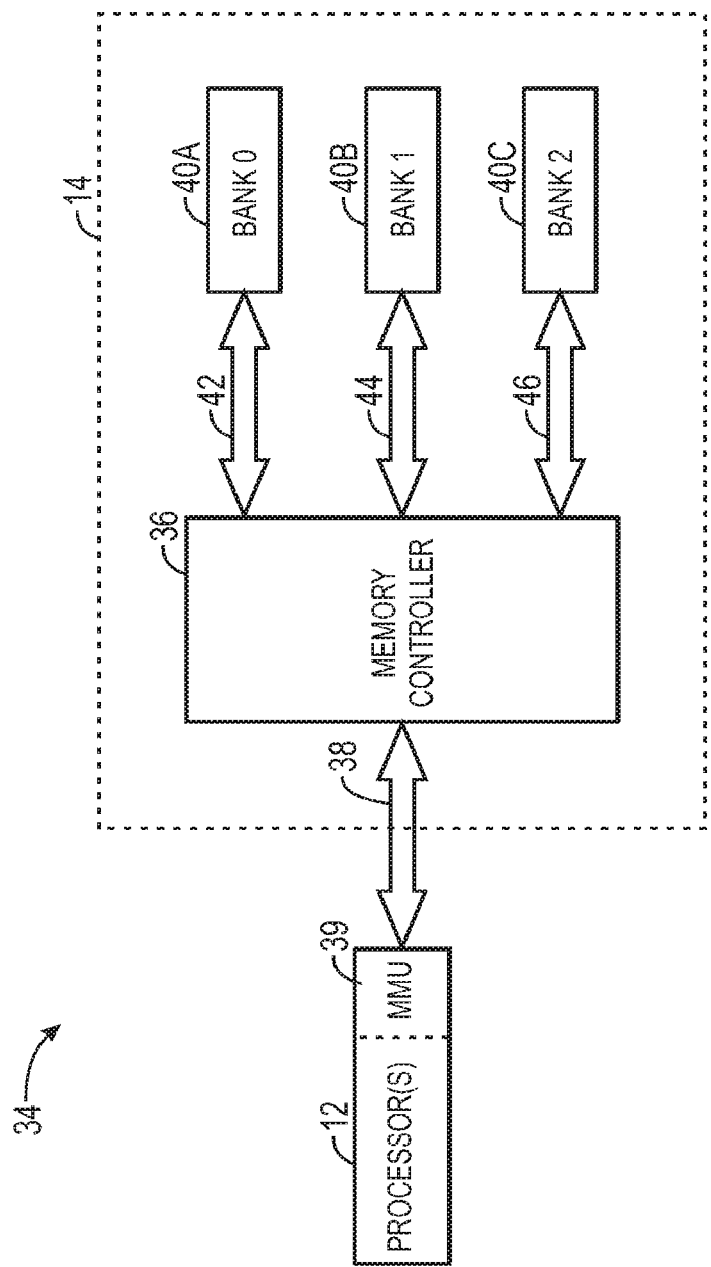
FIG. 3 is a block diagram of a memory management system employed by the electronic device of FIG. 1, in accordance with an embodiment.

As shown in FIG. 3, the processor(s) 12 may communicate with the memory 14 through a memory controller 36 and a bus 38. In general, an operating system (OS) running on the processor(s) 12 may allocate and deallocate memory at logical addresses. In some embodiments, a memory management unit (MMU) 39 of the processor(s) 12 may translate the logical addresses employed by the OS into physical addresses that generally correspond to a memory addresses understood by the memory controller 36. The MMU 39 may perform this translation using one or more translation look aside buffers (TLB) or any other suitable hardware. In some other embodiments, the OS of the processor(s) 12 may translate the logical addresses to the physical addresses. The memory controller 36 may receive instructions to read data from or write data to one of the physical address from the processor(s) 12.

Contiguous physical addresses requested by the processor(s) 12 may not directly correspond to contiguous hardware memory locations located on memory banks 40A, 40B, and 40C, shown in FIG. 3 as bank 0, bank 1, and bank 2. Rather, the memory controller 36 may map the physical addresses requested by the processor(s) 12 to certain hardware memory locations, also referred to herein as "storage cells" or "dual in-line memory module (DIMM) addresses," that may be distributed approximately evenly across all of the memory banks 40A, 40B, and 40C. The memory banks 40A, 40B, and 40C may include any suitable memory devices, such as double data rate three synchronous dynamic random access memory (DDR3 SDRAM), double data rate three synchronous dynamic random access memory (DDR4 SDRAM), and/or graphics double data rate five synchronous dynamic random access memory (GDDR5 SDRAM). The memory controller 36 may communicate with the three memory banks 40A, 40B, and 40C via memory buses 42, 44, and 46, which may respectively interconnect the memory controller 36 with banks 0, 1, and 2. In alternative embodiments, the memory management system 34 may include more or fewer memory buses and memory banks 40.

As noted above, the physical addresses may not be contiguously mapped across the DIMM addresses memory banks 40A, 40B, and 40C, but rather may be mapped such that no two "related" or "contiguous" physical addresses are mapped to the same memory bank 40. As used herein, the terms "related" or "contiguous" physical addresses refer to physical addresses that are likely to be accessed in succession (e.g., physical addresses mapped to contiguous software logical memory addresses by the OS), even if the physical addresses are not strictly numerically contiguous. That is, depending on the capability of the memory banks 40A, 40B, and 40C to provide access to successive DIMM addresses without further latency, a first physical address may be mapped to a DIMM address on bank 0, a second physical address may be mapped to a DIMM address on bank 1, and so forth. This scheme may be altered when the memory banks 40A, 40B, and 40C have different bandwidth characteristics, such that a higher bandwidth memory bank may have mapped to it more than one related physical address. For example, some embodiments may involve mapping the first and second physical addresses to DIMM addresses on bank 0 and bank 1, respectively, and mapping third and fourth physical addresses to bank 2. In general, the physical addresses may be distributed to DIMM addresses of the memory banks 40A, 40B, and/or 40C to reduce latency "low points." When large segments of physical addresses are requested by the processor(s) 12, the memory controller 36 may, in certain embodiments, gain access to three physical addresses at a time via the three memory buses 42, 44, and 46, which may effectively maximize the data transfer bandwidth.

The memory controller 36 generally may map the physical addresses requested by the processor(s) 12 to the DIMM addresses of the memory banks 40A, 40B, and 40C such that each memory bank 40 includes as many related physical addresses as possible without incurring undue latency. Therefore, if each memory bank 40 is capable of providing access only to one physical address at a time without incurring additional latency, the physical addresses may be distributed such that no two related physical addresses map to two DIMM addresses on the same memory bank 40, as discussed above. If each memory bank 40 is capable of providing access to no more than two physical addresses at a time without incurring additional latency, the physical addresses may be distributed such that no three related physical addresses map to three DIMM addresses on the same memory bank 40.

In some alternative embodiments, the memory controller 36 may not map the physical addresses requested by the processor(s) 12 to the DIMM addresses of the memory banks 40A, 40B, and 40C such that each memory bank 40 includes as many related physical addresses as possible without incurring undue latency, as discussed briefly above. Instead, the memory controller 36 may map the physical addresses to the DIMM addresses such that each memory bank 40 includes fewer related physical addresses than the maximum possible without latency. Thereafter, when the memory controller 36 causes a memory bank 40 and/or memory bus 42, 44, and/or 46 to be shut down to conserve power, remapping the remaining physical addresses to the DIMM addresses of the remaining memory banks 40, additional latency may not be incurred even if two related physical addresses are mapped to the same memory bank 40. In other words, if each memory bank 40 is capable of providing access to no more than two physical addresses at a time without incurring additional latency, the physical addresses may be distributed such that no two related physical addresses map to three DIMM addresses on the same memory bank 40. Thus, as discussed in greater detail below, when the memory controller 36 reduces the number of active memory banks 40A, 40B, and 40C and two related physical addresses then may be mapped to the same memory bank 40, the memory bank 40 may not incur additional latency.

Also, in certain embodiments, not all memory buses 42, 44, and 46 may have the same bandwidth capabilities, and not all memory banks 40A, 40B, and 40C may operate with the same latency. Indeed, the memory banks 40A, 40B, and 40C may have different signaling characteristics or different sizes. In some embodiments, at least one memory bank 40 may be DDR memory, while another memory bank 40 may be Flash memory. Under such conditions, the memory controller 36 may account for such asymmetries by mapping the physical addresses to the DIMM addresses of the memory banks 40A, 40B, and 40C such that each includes as many related physical addresses as possible (or fewer, as in the alternative embodiments mentioned above) without incurring undue latency, though the mapped distribution of physical addresses to DIMM addresses may not evenly be distributed.

As will be discussed below, the memory controller 36 may control when one or more of the memory banks 40A, 40B, and 40C and/or memory buses 42, 44, and 46 are shut down (e.g., by turning off the memory, placing the memory in a self-refresh mode, or setting the memory to any other lower-power-consumption mode) to conserve power. When the memory controller 36 undertakes steps to shut down a memory bank 40A, 40B, or 40C and/or one of the memory buses 42, 44, and/or 46, the memory controller 36 may dynamically remap a reduced set of the physical addresses to the DIMM addresses of the remaining memory banks 40 on the fly.

When all of the memory banks 40A, 40B, and 40C are active, the memory controller 36 may dynamically map physical addresses requested by the processors 12 to certain memory storage cells, or DIMM addresses, in the memory 14. FIG. 4 illustrates one embodiment of such a dynamic mapping scheme. In the embodiment of FIG. 4, a memory mapping diagram 48 illustrates a manner in which related physical addresses may be distributed approximately evenly across the memory banks 40A, 40B, and 40C, according to a dynamic mapping function, or equations, employed by the memory controller 36. Although the present disclosure describes a particular memory mapping function that achieves the result illustrated in the memory mapping diagram 48, the memory controller 36 may employ any mapping function that dynamically maps physical addresses to DIMM addresses across the three memory banks 40A, 40B, and 40C in one of the manners described above. Moreover, while the present disclosure generally refers to mapping physical addresses to the certain hardware memory locations, it should be understood that other memory mapping configurations may involve distributing pages or any other suitable granularities of memory across multiple memory banks 40.

In the memory mapping diagram 48, a leftmost column labeled "physical address" indicates physical addresses that may be requested of the memory controller 36 by the processor(s) 12. A column labeled "bank" lists each memory bank 40A, 40B, and 40C (bank 0, bank 1, and bank 2). For explanatory purposes only, each memory bank 40 holds eight memory addresses. In practice, it should be understood that the size of the memory banks 40 and their memory addresses may be much larger, and may represent any size chunk of memory that may be manipulated by the memory controller 36 (e.g., a cache line or page). A column labeled "DIMM address" illustrates the mapping of the physical addresses to certain hardware memory locations, or DIMM addresses, on the three memory banks 40A, 40B, and 40C. Thus, the DIMM address 0 may hold data associated with the physical address 0, the DIMM address 1 may hold data associated with the physical address 3, and so forth. Moreover, as noted above, the physical addresses may not be directly, contiguously mapped to the DIMM addresses. For clarity, however, the physical addresses may be understood to correspond sequentially to a quantity of memory addresses that each memory bank 40 could hold. That is, the first eight physical addresses are noted via a first hatching, the second eight physical addresses are noted via a second hatching, and the third eight physical addresses are noted via a third hatching. These hatchings are intended to more clearly illustrate how the memory controller 36 may map and remap these physical addresses to DIMM addresses across the memory banks 40A, 40B, and 40C.

When the processor(s) 12 instruct the memory controller 36 to access a physical address, the memory controller 36 may dynamically map the physical address to its corresponding DIMM address in the memory banks 40A, 40B, and 40C according to a memory mapping function. To achieve the results of the memory mapping diagram 48, the following memory mapping function may be employed:

$$BankIndex = Floor(PAddr/TotalBanks) \quad (1)$$ and $$DIMMAddr = MOD(PAddr*BankSize, TotalMemory) + BankIndex \quad (2).$$

In Equations (1) and (2) above, the variable PAddr represents the physical address listed in the leftmost column of the memory mapping diagram 48 and the variable DIMMAddr represents the DIMM address to which the physical address is mapped. The variable BankIndex represents an offset value for varying to which of the DIMM addresses of a memory bank 40 a physical address is mapped. The variable BankSize represents the quantity of physical addresses per memory bank 40. The variable TotalBanks represents the total number of memory banks 40A, 40B, and 40C and the variable TotalMemory represents the total number of DIMM addresses. This may be referred to as strip memory, which wraps around, but offsets, physical addresses by their nominal original bank to avoid sequentially mapping to the same DIMM address.

In one example, the memory controller 36 may map the physical address "4" to the DIMM address "9" as follows:
MOD(PAddr*BankSize,TotalMemory)+BankIndex
MOD(4*8,24)+Floor(4/3)
MOD(32,24)+1
8+1
9
In another example, the memory controller 36 may map the physical address "2" to the DIMM address "16" as follows:
MOD(PAddr*BankSize,TotalMemory)+BankIndex
MOD(2*8,24)+Floor(2/3)
MOD(16,24)+0
16+0
16

In this manner, the memory controller 36 may dynamically map the physical addresses to DIMM addresses in accordance with the mapping function described by Equations (1) and (2). In the embodiment of the memory mapping diagram 48, based on the memory mapping function of Equations (1) and (2), physical addresses may be mapped to DIMM addresses in a manner that prevents sequential, related physical addresses from being mapped to the same memory bank 40. This configuration may generally maximize the bandwidth available when the processor(s) 12 request a series of sequential physical addresses when the memory banks are capable of accessing one DIMM addresses at a time without latency. In other embodiments, if a particular memory bank 40 is capable of accessing two or more DIMM addresses at a given time without additional latency, the mapping function may be adapted to distribute the physical addresses such that two or more sequential physical addresses map to DIMM addresses on the same memory bank 40.

In certain embodiments, despite that the memory banks 40A, 40B, and 40C may be capable of accessing two or more DIMM addresses at a given time without additional latency, the memory controller 36 may still employ the mapping function described above. In so doing, when the memory controller 36 causes one of the memory banks 40A, 40B, and 40C and/or one of the memory buses 42, 44, and 46 to be shut down to conserve power, and remaps the remaining physical addresses to the DIMM addresses of the remaining memory banks 40A, 40B, and 40C, latency may not significantly increase, even when two related physical addresses are subsequently mapped to the same memory bank 40.

The electronic device 10 may use various quantities of the memory 14 at different points in time. In particular, memory associated with graphics may be very volatile, used in highly variable quantities at different times. FIGS. 5 and 6 represent schematic diagrams illustrating such variations in memory usage. Turning first to FIG. 5, a memory usage diagram 50 represents the total amount of memory available across the three memory banks 40A, 40B, and 40C. In-use memory 52 may store data associated with, among other things, a screen on the display 18, a cursor, windows that may have animation, assembly buffers, and so forth. The in-use memory 52 may not occupy all of the total available memory, however, as a certain amount of unused memory 54 may remain in the memory banks 40A, 40B, and 40C. As shown in the memory usage diagram 50, the total amount of memory currently in active or frequent use by the electronic device 10 may span more than the total quantity of memory available to two of the memory banks 40A, 40B, and 40C. As such, all three memory banks 40A, 40B, and 40C may be employed. During situations in which the memory usage is as shown in FIG. 5, the memory mapping function employed by the memory controller 36 may map physical addresses to DIMM addresses located across the three memory banks 40A, 40B, and 40C.

At other times during the operation of the electronic device 10, less memory may be employed. For example, as shown in FIG. 6, a memory usage diagram 56 may include a smaller amount of in-use memory 52 and a larger amount of unused memory 54. In the memory usage diagram 56, the amount of in-use memory 52 may span more than one memory bank 40 but less than all three memory banks 40A, 40B, and 40C.

Figure 7:
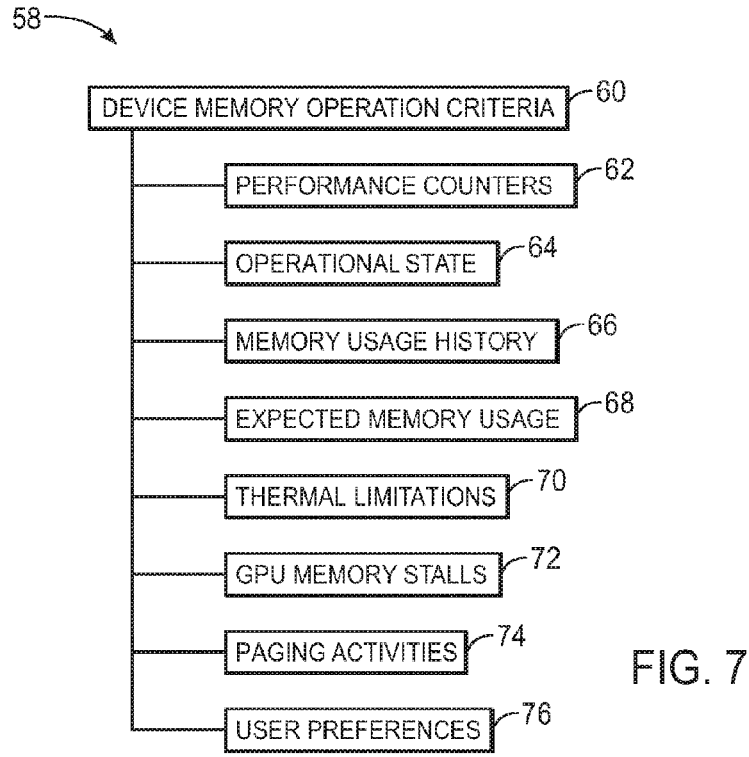
FIG. 7 is a memory management factor diagram representing a variety of factors that may be considered in deciding whether to power up or down a memory bank.

As the memory usage of the electronic device 10 changes, the electronic device 10 may sufficiently operate with less memory bandwidth and/or with less total memory. Accordingly, based on certain criteria, the electronic device memory management system 34 may take steps to reduce the amount of power consumed by the memory 14. A memory management factor diagram 58 of FIG. 7 illustrates several such device memory operation criteria 60, which may include, among other things, indications by performance counters 62, an operational state 64 of the electronic device 10, a memory usage history 66 of the electronic device 10, an expected memory usage 68 of the electronic device 10, thermal limitations 70 of the electronic device 10, GPU memory stalls 72, paging activities 74, and/or user preferences 76.

Representing one criterion that may indicate whether more or less memory should be available to the electronic device 10, the performance counters 62 may represent a continuous monitoring by the operating system (OS) of the system performance of the electronic device 10. For example, the performance counters 62 may indicate how much processing is taking place at a given time and/or may provide a recent history of how system resources have been consumed. A higher consumption of processing resources, as indicated by the performance counters 62, may signal that the available memory resources should be increased, if possible. Similarly, a reduced consumption of processing resources may signal that the available memory resources should be reduced, if possible.

Another criterion that may indicate whether more or less memory should be available to the electronic device 10 may be the operational state 64 of the electronic device 10. In some embodiments, the operational state 64 may be determined based on the performance counters 62, and may represent, for example, whether the electronic device 10 is operating in an active, high performance, or idle state. Additionally or alternatively, the operational state 64 may indicate whether the electronic device 10 is operating in a reduced power state, for example, because the power source 26 has changed from an external AC source to a battery source or because battery power is low. Certain operational states 64 (e.g., an active state) may signal that the available memory resources should be increased, if possible. Other operational states 64 (e.g., an idle state) may signal that the available memory resources should be reduced, if possible.

Because past memory usage may be indicative of likely future memory usage, the memory usage history 66 and expected memory usage 68 may represent criteria for determining whether more or less memory should be made available to the electronic device 10. The memory usage history 66 may represent recent historical memory usage (e.g., memory usage of the prior 1 minute, 2 minutes, 5 minutes, 10 minutes, 20 minutes, 1 hour, etc.) and/or may represent memory usage patterns for extended periods of time (e.g., memory usage over prior days, weeks, months, and/or the life of the electronic device 10). Expected memory usage 68 may derive from the memory usage history 66 or may be based on typical patterns of memory use for the electronic device 10. The memory usage history 66 and/or the expected memory usage 68 may signal whether the available memory resources should be increased or reduced, depending on whether more or less memory is in use or expected to be in use.

The memory usage history 66 and/or the expected memory usage 68 may be illustrated by the following examples. In a first example, the operating system (OS) of the electronic device 10 may recognize when certain application programs with known memory consumption histories are launched. When an application that has historically consumed large quantities of memory is launched, the OS or the application may provide an indication that a relatively large quantity of memory may be consumed in the near future. In another example, the electronic device 10 may predict when large quantities of memory are typically needed for use by the user based on the user's historical usage patterns. For example, the electronic device 10 may recognize that on Tuesday morning the electronic device 10 typically performs a significant quantity of image processing, or that on Thursday evening, the electronic device 10 is used to play memory-intense 3-D games. As such, on Tuesday morning and Thursday evening, the memory usage history 66 and the expected memory usage 68 may weigh significantly in favor of increasing available memory resources. In a third example, an application currently running on the electronic device 10 may provide a cue to indicate that a relatively large amount of memory is about to be needed in the near future or that a relatively low amount of memory is about to be needed in the near future. Based on such cues, the expected memory usage 68 (e.g., as determined by the OS of the electronic device 10) may weigh in favor of increasing or decreasing the currently available memory as needed. In a fourth example, the OS may follow the allocation patterns of memory to determine when large patterns of memory allocation have occurred in the past and may be likely to occur in the future.

Another criterion that may indicate whether more or less memory should be made available to the electronic device 10 may be thermal limitations 70 that are placed on the electronic device 10. Due to external heat from the environment and internal heat generated by components of the electronic device 10, particularly after extended periods of high performance operation, the electronic device 10 may approach the thermal limitations 70. If such thermal limitations 70 are approached, the electronic device 10 may be more likely to determine that the available memory resources should be reduced. With reduced memory resources generating heat, the amount of internally-generated heat may accordingly be reduced and the electronic device 10 may retreat from the thermal limitations 70.

In some embodiments, device memory stalls, such as CPU or GPU memory stalls 72, or memory stalls by any other data processing circuitry of the electronic device 10, and memory paging activities 74 may indicate whether more or less memory should be made available to the electronic device 10. The presence of GPU memory stalls 72 may indicate that more memory should be made available, while the lack of such GPU memory stalls 72 may indicate that the electronic device 10 currently has an excess supply of memory. Likewise, memory paging activities 74 may indicate a degree to which the available memory is or is not in active or frequent use.

A further criterion that may indicate whether to increase or decrease the available memory resources of the electronic device 10 may be user preferences 76. For example, the user of the electronic device 10 may indicate a preference for increased battery life over high performance, or vice versa. Similarly, the user may elect to cause the electronic device 10 to enter a lower or higher memory consumption mode. In another example, the electronic device 10 may be capable of use by multiple users, and different users may operate the electronic device 10 in different ways. That is, some users may generally employ memory-intense applications, while others may generally employ applications that consume relatively little memory. By tracking user memory-consumption behavior, the electronic device 10 may determine each user's preferences 76. Thereafter, when the user is using the electronic device 10, the user preferences 76 may weigh in favor of increasing or decreasing the available memory.

Figure 8:
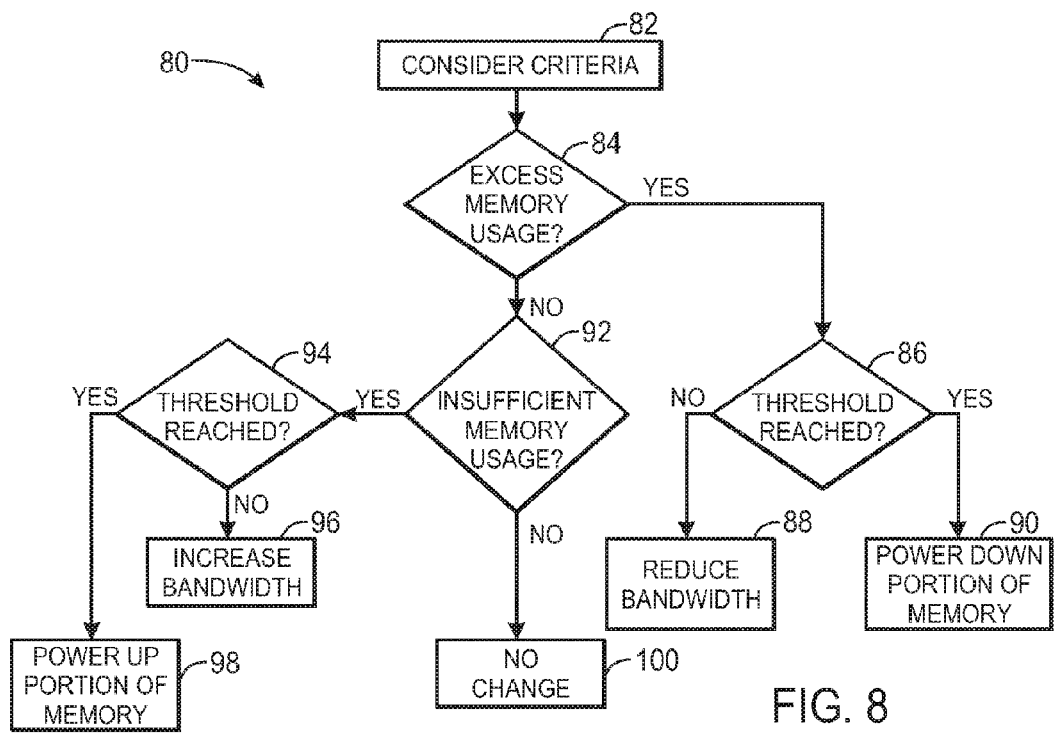
FIG. 8 is a flowchart describing an embodiment of a method for balancing power management and performance considerations based on the criteria presented in the factor diagram of FIG. 7.

As noted above, the electronic device 10 may consider the memory operation criteria 60 in determining how to manage the memory 14 of the electronic device 10. One embodiment of a method for managing the memory 14 based on such criteria 60 appears in a flowchart 80 of FIG. 8. In a first block 82, the electronic device 10 (e.g., the memory controller 36, the processor(s) 12, the OS running on the processor(s) 12, and/or software running on the OS) may consider some or all of the memory operation criteria 60. In some embodiments, the criteria 60 may be weighed against one another to ascertain whether, on balance, electronic device 10 memory usage is excessive or insufficient, or is expected to become excessive or insufficient in the future. In some embodiments, certain criteria 60 may be given different weights and/or certain criteria 60 may override all others (e.g., thermal limitations 70 may receive priority when heat becomes excessive).

As illustrated by decision block 84, if available memory is determined to be in excess or is expected to be in excess in the near future (e.g., as of the time needed to remap and deactivate excess memory), the electronic device 10 may consider whether the excessiveness of the memory usage has crossed a threshold justifying the deactivation of one or more portions of the memory 14 in decision block 86. By way of example, when a user elects to close a high-memory-consuming application, the electronic device 10 may determine that the currently available memory is expected to be excessive once the application has closed. The threshold may include a time component, which may represent a length of time that the memory usage has been excessive, and/or may include a quantitative component, which may represent the extent to which the memory usage is deemed in excess. In some embodiments, the threshold may represent an amount of total excess memory usage and/or an amount of time that the amount of in-use memory has remained below a certain number of portions of the memory 14 (e.g., usage of less than 2 memory banks 40, as shown in FIG. 6). If the threshold has not been reached in decision block 86, the electronic device 10 may reduce some power consumption by reducing the clock speed and/or operating voltage of the memory banks 40A, 40B, and/or 40C and/or their associated memory buses 42, 44, and/or 46 in block 88 to place them into a reduced power consumption mode. If the threshold has been reached in decision block 86, the electronic device 10 may reduce additional power consumption by deactivating one of the memory banks 40A, 40B, and/or 40C and/or their associated memory buses 42, 44, and/or 46 in block 90. A more detailed description of how such deactivation may take place is described below.

The process of decision blocks 84 and 86 to block 90, when one or more memory banks 40 are powered down, may be carried out in a variety of other manners. In some embodiments, logic associated with the memory controller 36 may initiate the shut-down process when the memory usage of the electronic device 10 has been reduced to a total number of physical addresses that may be mapped to DIMM addresses in a fewer number of memory banks 40A, 40B, and 40C than currently in use. To do so, in certain embodiments, the operating system (OS) running on the processor(s) 12, or software running on the OS, may follow decision blocks 84 and 86 above to determine when to power down a memory bank 40. The OS may then instruct the processor(s) 12 to send a control signal to the memory controller 36, causing the shut-down process to begin in block 90.

In other embodiments, the processor(s) 12 may automatically detect when the memory usage has fallen to encompass fewer memory banks 40A, 40B, and 40C than currently in use. For example, the MMU 39 may periodically or continuously provide to the processor(s) 12 an indication of the total number of logical addresses that are currently in use and/or mapped to physical addresses. Thereafter, the processor(s) 12 may send a control signal to the memory controller 36 to initiate the shut-down process.

In certain other embodiments, logic associated with the memory controller 36 may automatically detect when fewer memory banks 40A, 40B, and 40C should be used by monitoring which physical addresses are being requested by the processor(s) 12. For example, if no physical addresses extending beyond bank 1 are requested by the processor(s) 12 for a threshold period of time (e.g., 10 seconds, 20 seconds, 1 minute, 2 minutes, 5 minutes, 10 minutes, 20 minutes, etc.), the memory controller 36 may understand that these physical addresses are not needed, and may thus initiate the shut-down process automatically.

Returning to decision block 84, if the memory usage of the electronic device 10 is not determined to be in excess, the electronic device 10 may determine, in decision block 92, whether the total memory currently available is insufficient in light of the memory operation criteria 60. In decision block 94, the electronic device 10 may consider whether the insufficiency of the memory usage has crossed a threshold justifying the reactivation of one or more portions of the memory 14 that have previously been shut down. Such a threshold may include a time component, which may represent a length of time that the memory usage has been insufficient, and/or may include a quantitative component, which may represent the extent to which the memory usage is deemed insufficient. In some embodiments, the threshold may represent an amount of total memory usage and/or an amount of time that the amount of in-use memory has remained above a limit approaching a certain number of portions of the memory 14 (e.g., usage of nearly all of 2 memory banks 40, when one memory bank 40 has been shut down).

If the threshold has not been reached in decision block 94, the performance of the electronic device 10 may be increased, without significantly increasing power consumption, by increasing the clock speed and/or operating voltage of the memory banks 40A, 40B, and/or 40C and/or their associated memory buses 42, 44, and/or 46 in block 96. If the threshold has been reached in decision block 94, the electronic device 10 may reactivate one of the memory banks 40A, 40B, and/or 40C and/or their associated memory buses 42, 44, and/or 46, which previously may have been shut down, in block 98. If the criteria 60 indicate neither that the memory usage is excessive in decision block 84, nor that the memory usage is insufficient in block 92, the electronic device 10 may not substantially change the configuration of the memory 14, as indicated by block 100.

Figure 9:
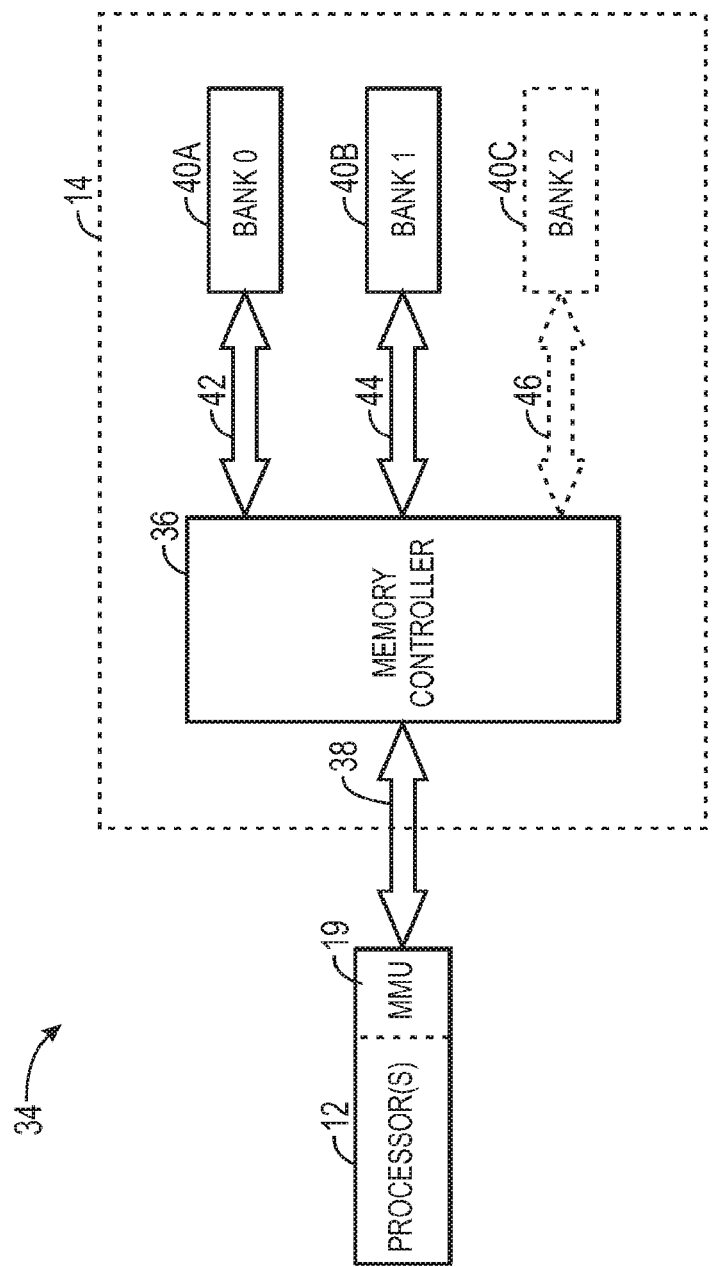
FIG. 9 is a block diagram of the memory management system of FIG. 3 when one bank of memory and its associated memory bus is powered down, in accordance with an embodiment.

As noted above, one or more portions of the memory 14 may be deactivated to conserve power. In some embodiments, as illustrated by FIG. 9, such portions of the memory 14 may include one or more memory banks 40. In particular, FIG. 9 illustrates a manner by which the memory management system 34 may conserve power by causing the memory bank 40C (bank 2) and/or the associated memory bus 46 to be shut down, after remapping and copying certain physical addresses from the memory bank 40C to the remaining memory banks 40A and 40B. In FIG. 9, the memory controller 36 is illustrated as having caused memory bank 40C (bank 2) and the associated memory bus 46 to shut down. However, it should be understood that the memory controller 36 may alternatively cause any other of the memory banks 40A or 40B and/or memory buses 42 or 44 to be shut down, depending on design considerations and/or an operational status of the electronic device 10. Moreover, while one entire memory bank 40C is illustrated as having been shut down, in some embodiments, the memory controller 36 may cause only a portion of the memory bank 40C to be shut down.

The memory controller 36 may cause the selected memory bank 40C and/or memory bus 46 to shut down in any suitable manner. For example, in one embodiment, the memory bank 40C may be capable of shutting down upon the receipt of a specific control signal or instruction from the memory controller 36. Additionally or alternatively, the memory controller 36 may cause a power supply to the selected memory bank 40 to be cut off by, for example, directing a switch (not shown) to cut off power.

Figure 10:
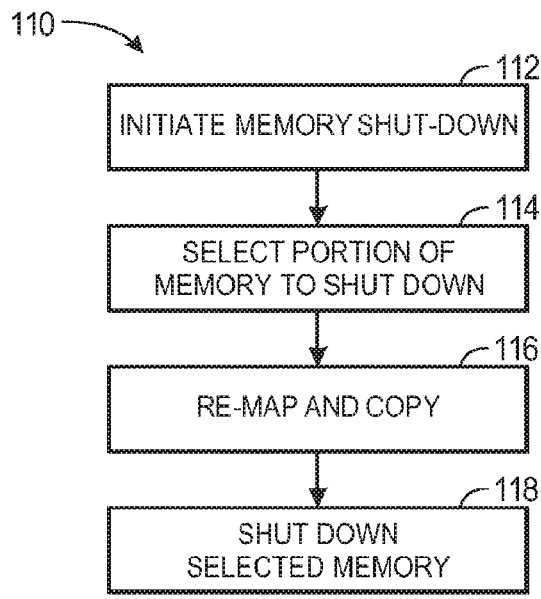
FIG. 10 is a flowchart describing an embodiment of a method for powering down one bank of memory.

One embodiment of a method for carrying out the memory shut-down process is illustrated by a flowchart 110 of FIG. 10. In a first block 112, the memory controller 36 may begin the process of powering down one of the memory banks 40A, 40B, or 40C and/or a memory bus 42, 44, or 46. As noted above with reference to FIG. 8, the memory controller 36, the processor(s) 12, the OS running on the processor(s) 12, and/or software running on the OS may determine whether to shut down one of the memory banks 40A, 40B, or 40C based on one or more of the memory operation criteria 60. By way of example, block 112 may occur after the OS determines that its working set of memory is or could be made small enough not to use memory from one of the memory banks 40A, 40B, or 40C. In some embodiments, the OS then may stop using an amount of memory equal to that of one of the memory banks 40A, 40B, or 40C. For example, if each of the memory banks 40A, 40B, and 40C have the same capacity, the OS may stop using one-third of the memory.

After a determination has been made to begin the shutdown process in block 112, the memory controller 36 may select which of the memory banks 40A, 40B, or 40C to shut down in block 114. In some embodiments, the memory controller 36, the processor(s) 12, the OS running on the processor(s) 12, and/or software running on the OS may select for shutdown one of the memory banks 40A, 40B, and 40C in a certain order. For example, if all memory banks 40A, 40B, and 40C are currently active, bank 2 may be selected for shut-down; if only two of the memory banks 40A, 40B, and 40C are currently active, bank 1 may be selected for shutdown. By way of example, the OS may call the memory controller 36 to cause the memory bank 40A, 40B, or 40C to be shut down (e.g., turned off or placed into a self-refresh mode).

Alternatively, in block 114, the memory controller 36, the processor(s) 12, the OS running on the processor(s) 12, and/or software running on the OS may determine which memory bank 40 and/or memory bus 42, 44, or 46 to shut down based on power consumption factors balanced with bandwidth factors. For example, certain of the memory banks 40A, 40B, and 40C and/or memory buses 42, 44, and 46 may have higher bandwidth capabilities, but may consume more power. When bandwidth concerns outweigh power consumption concerns, the memory controller 36 may select a lower-bandwidth memory bank 40 and/or memory bus 42, 44, or 46 to shut down, conserving some power but preserving a greater amount of memory bandwidth. When power consumption concerns outweigh bandwidth concerns, the memory controller 36 may instead select a higher-bandwidth memory bank 40 and/or memory bus 42, 44, or 46 to shut down.

As will be described in greater detail below, in block 116, the memory controller 36 may remap the remaining, or active, physical addresses to DIMM addresses and copy the data from the memory bank 40 selected to be shut down prior to shutting down the selected memory bank 40. After remapping and copying, in block 118, the memory controller 36 may cause the selected memory bank 40 and/or memory bus 42, 44, or 46 to shut down in any suitable manner. For example, in one embodiment, the memory bank 40 may capable of shutting down upon the receipt of a specific control signal or instruction from the memory controller 36. Additionally or alternatively, the memory controller 36 may cause a power to the selected memory bank 40 to be cut off by, for example, directing a switch (not shown) to cut off power.

Figure 11:
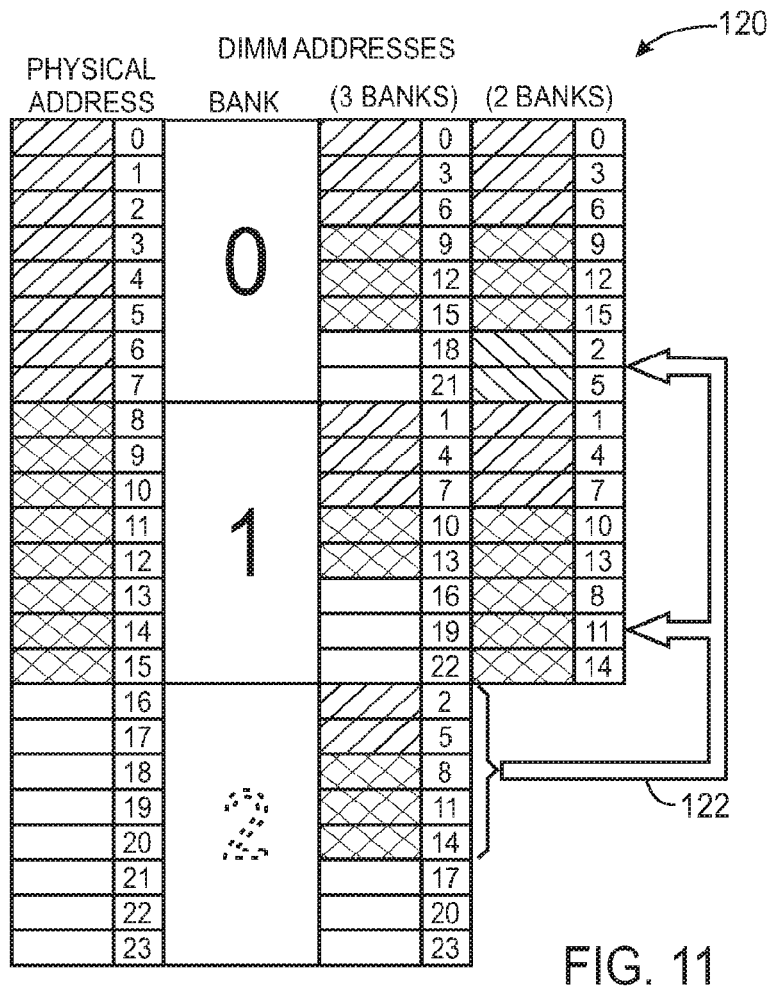
FIG. 11 is a schematic diagram illustrating a process for dynamic memory remapping from three banks of memory to two banks of memory, in accordance with an embodiment.

Turning to FIG. 11, a memory mapping diagram 120 illustrates a manner of dynamically remapping from the three-bank mapping scheme to a two-bank mapping scheme on the fly, as employed during block 116 of FIG. 10. A column labeled "Physical Address" lists physical addresses. Physical addresses no longer in use (e.g., 16-23), which may be referred to as "inactive physical addresses," are illustrated with dashed formatting. A column labeled "Bank" lists the memory banks 40A, 40B, and 40C (bank 0, bank 1, and bank 2), which, for explanatory purposes only, are shown to hold eight DIMM addresses. In practice, it should be understood that the size of the memory banks 40 and their memory addresses may be much larger, and may represent any size chunk of memory that may be manipulated by the memory controller 36 (e.g., a cache line or page). The memory bank 40 that is to be shut down (e.g., bank 2) is illustrated with dashed formatting. A column labeled "DIMM Address (3 Banks)" illustrates the original mapping of physical addresses to certain hardware memory storage locations, or DIMM addresses, on the three memory banks 40A, 40B, and 40C. A column labeled "DIMM Address (2 Banks)" illustrates a remapping of the active physical addresses to certain hardware memory storage locations, or DIMM addresses, when the number of active memory banks 40 is reduced from three to two.

Prior to remapping, the OS running on the processor(s) 12, software running on the operating system (OS), or the processor(s) 12 (e.g., in some embodiments, the MMU 39) may arrange the in-use physical addresses such that the in-use physical addresses are outside the area of memory to be powered down. For example, certain wired physical addresses or pages may be cleared out. Thereafter, the OS, the software, and/or the processor(s) 12 may cause the memory controller 36 to receive a command to begin the dynamic remapping process. Additionally or alternatively, the memory controller 36 may automatically determine to begin the dynamic remapping process as discussed above.

The memory controller 36 may employ an alternative dynamic memory mapping function to remap the in-use physical addresses that have been mapped, in the three-bank mapping scheme, to DIMM addresses of the third memory bank 40. The alternative memory mapping function may be any suitable function that maintains the mapping of the active physical addresses located on the memory banks 40A, 40B, and 40C that will remain in use, while remapping DIMM addresses that map, in the three-bank scheme, to inactive physical addresses. In the example of the memory remapping diagram 120, the memory banks 0 and 1 are to remain active, and the active physical addresses (e.g., 0-15) mapped to DIMM addresses on banks 0 and 1 may not change. When a DIMM address of one of the active memory banks 40A, 40B, and 40C is mapped to an inactive physical address (e.g., 16-23), the memory controller 36 may remap these DIMM addresses on-the-fly. An alternative memory mapping function for the remaining physical addresses may include the following relationships:

ALT_$DIMM$Addr3_2=If
($DIMM$Addr<ReducedMemory3_2, (3),

Then DIMMAddr,
Else If(BankReindex3_2<FirstBankEntries3_2,
Then FirstBankOffset3_2+BankReindex3_2,
Else SecondBankOffset3_2+BankReindex3_2))

where:

BankReindex3_2=If
($DIMM$Addr<ReducedMemory3_2, (4);

Then −1,
Else DIMMAddr−ReducedMemory3_2)

FirstBankEntries3_2=Floor(BankSize/TotalBanks) (5);

FirstBankOffset3_2=Floor(ReducedBanks3_
2*BankSize/TotalBanks) (6); and

SecondBankOffset3_2=FirstBankEntries3_2+Bank-
Size−Floor(BankSize/TotalBanks)+3 (7).

In Equations (3)-(7) above, the variable ALT_DIMMAddr3_2 represents the alternative DIMM address mapping for the two-bank mapping scheme, the variable DIMMAddr represents the DIMM address mapping for the three-bank mapping scheme, and ReducedMemory3_2 represents the newly reduced quantity of DIMM addresses available across the remaining active memory banks 40A, 40B, and 40C. The variable BankReindex3_2 is employed, in combination with the variables FirstBankEntries3_2, FirstBankOffset3_2, and SecondBankOffset3_2 to ascertain the alternative DIMM address mapping. Used in determining these variables, the variable BankSize represents the quantity of physical addresses per memory bank 40, the variable Total-Banks represents the total number of memory banks 40A, 40B, and 40C, and the variable ReducedBanks3_2 represents the number of memory banks 40A, 40B, and 40C remaining once the selected memory bank 40 is shut down.

As noted above with reference to FIG. 4, and as also illustrated in FIG. 11, under a three-bank memory mapping scheme, the physical address "4" maps to DIMM address "9." In a two-bank memory mapping mode, using the alternative memory mapping function of Equations (3)-(7), the physical address "4" may continue to be mapped to the DIMM address "9." By contrast, the physical address "2" may be remapped from the DIMM address "16," which is located on the memory bank 40 that is to be shut down (e.g., bank 2), to the DIMM address "6."

The memory controller 36 may employ a copy function 122 to copy the data from the soon-to-be-shut-down memory bank 40 (e.g., bank 2) into the newly remapped memory banks 0 and 1. In copying the memory data, the memory controller 36 may simply write over the data in the remapped addresses of the banks 0 and 1. By way of example, the memory controller 36 may read data from the DIMM addresses of the soon-to-be-shut-down memory bank 40 that correspond to the remaining active physical addresses. The memory controller 36 may then write the data to either the alternative DIMM address or both the alternative DIMM address and the original DIMM address. It should be noted that the copy function 122 may efficiently transfer the data from bank 2 to banks 0 and 1 without other intermediate copying steps, such as copying from any of the active banks 0 or 1. Finally, it should be noted that the memory remapping process that may take place as shown in the memory remapping diagram 120 may not involve any action on the part of a translation look aside buffer (TLB) of the MMU 39 of the processor(s) 12, but rather may take place dynamically with only the memory controller 36 performing remapping and copying in a rapid, efficient manner.

The memory bank 40 to be shut down (e.g., bank 2) may continue to be accessible while the remapping is taking place. Since the data stored on the memory bank 40 to be shut down (e.g., bank 2) is written into both the three-bank DIMM address mapping and two-bank DIMM address mapping (e.g., written to hardware memory locations on banks 0, bank 1, and bank 2), the data on the memory bank 40 to be shut down will remain accessible at the three-bank DIMM address mapping until the memory bank 40 is actually shut down. Moreover, it should be understood that this principal of remapping may be extended to any reduced number of memory banks 40, and not only the case from three memory banks 40 to two memory banks 40. That is, until the memory bank 40 to be shut down (e.g., bank 2) is finally shut down, the memory controller 36 may continue to operate in the two-bank DIMM address mapping. Because the memory controller 36 continues to operate in the two-bank DIMM address mapping, the remapping operation may be aborted at any time before the memory bank to be shut down (e.g., bank 2) is finally shut down.

In certain embodiments, the memory controller 36 may swap, rather than destructively copy, the data from the soon-to-be-shut-down memory bank 40 (e.g., bank 2) into the newly remapped memory banks 0 and 1. By way of example, physical address 2 may be swapped with the physical address 18, the physical address 5 with 21, and so forth. Although performing such a swap function rather than a copy function may involve additional memory buffer(s) to hold the physical addresses being swapped while the swap is taking place, swapping may enable the data from physical addresses not currently in use to be available in the future. Specifically, the memory bank 40 to be shut down may be placed into a self-refresh mode, which may consume relatively little power but may preserve the data stored within the memory bank 40. At a later time, when the memory bank 40 is to be activated again and remapping occurs, the originally swapped physical addresses may be swapped back.

Moreover, as noted above, in some embodiments, the original 3-bank memory mapping function of Equations (1) and (2) may be calculated to distribute the physical memory addresses across the DIMM addresses such that each memory bank 40 includes fewer related physical addresses than the maximum possible without latency. Thereafter, using the alternative mapping function of Equations (3)-(7), the memory bank 40 may not incur additional latency, even if two related physical addresses are mapped to the same memory bank 40. Thus, two related physical addresses may be mapped to the same memory bank 40 based on the alternative mapping function, but may not significantly increase the latency of the memory 14.

Figure 12:
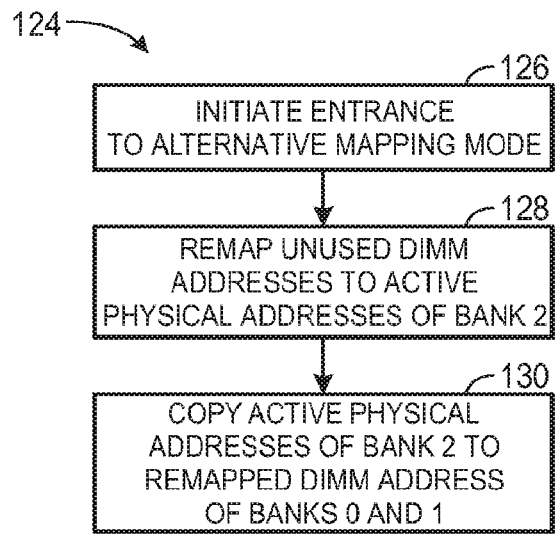
FIG. 12 is a flowchart describing an embodiment of a method for performing the process of FIG. 11.

Turning to FIG. 12, a flowchart 124 describes an embodiment of a method for carrying out the process shown in the memory remapping diagram 120. In a first block 126, the memory management system 34 may initiate entrance to a two-bank memory mapping mode. In block 128, the memory controller 36 may employ the alternative memory mapping function of Equations (3)-(7) when physical addresses are received from the processor(s) 12. In block 130, the memory data of the remaining active physical addresses on memory bank 2 may be copied onto the newly remapped memory addresses of memory banks 0 and 1, as illustrated in the memory mapping diagram 120. In one embodiment, the memory controller 36 may only read data from the DIMM addresses of the memory bank 40 to be shut down, but may write the data back to the three-bank DIMM addresses and to the two-bank DIMM addresses. While such copying takes place, the memory controller 36 may continue to operate in the three-bank memory mapping mode, asynchronously transitioning toward the two-bank memory mapping mode, provided each copy is atomic (i.e., each read of a given DIMM address is accompanied by writes back to the two DIMM addresses). That is, from the point of view of the operating system (OS), the memory controller 36 appears to be operating in the two-bank memory mapping. From the perspective of the OS, the OS is merely employing a reduced address space. Indeed, all reads and writes may occur as expected while the transition from the three-bank memory mapping to the two-bank memory mapping is taking place. In this way, the memory may be remapped dynamically and on-the-fly without excessive copying. Thus, if the memory controller 36 needs to perform other operations on the memory stored in the memory banks 40 for another purpose, the copying of block 130 may pause while the memory controller 36 performs such other operations. When the other operations have ended, the atomic copying of block 130 may continue until complete. Thereafter, as discussed above with reference to block 118 of FIG. 10, the selected memory bank 40 may be shut down. In certain embodiments, the memory controller 36 may carry out these techniques in a manner unseen by the processor(s) 12 or operating system (OS). In some embodiments, the OS may cause the memory controller 36 to perform certain or all of the blocks 126, 128, and 130 (e.g., the OS may cause atomic copies in block 130).

In one embodiment, the memory controller 36 may identify the physical address mapped to a DIMM address in the memory bank 40 to be shut down by applying the following relationship:

$$DIMMAddrBank = Floor(DIMMAddr/BankSize) \quad (8) \text{ and}$$

$$PAddr = MOD(DIMMAddr * TotalBanks, TotalMemory) + DIMMAddrBank \quad (9),$$

where the variable DIMMAddr represents the DIMM address to which the physical address is mapped and the variable PAddr represents the physical address. The variable DIMMAddrBank represents an offset value. The variable BankSize represents the quantity of physical addresses per memory bank 40, the variable TotalBanks represents the total number of memory banks 40A, 40B, and 40C, and the variable TotalMemory represents the total number of DIMM addresses.

By way of example, the DIMM address "16" on bank 2 maps to the physical address "2," in accordance with Equations (8) and (9) above. Since the DIMM address "16" holds data associated with the physical address "2," which is among the physical addresses to remain active, the memory controller 36 may read the DIMM address "16" and copy the data stored therein onto the alternative DIMM address mapping for the physical address "2" as well as the original DIMM address mapping for the physical address "2." The memory controller 36 may continue to assess each of the DIMM addresses of the memory bank 40 to be shut down (e.g., bank 2) until an inactive physical address (e.g., "17") is determined. Moreover, the memory bank 40 to be shut down (e.g., bank 2) may continue to be accessible while the remapping is taking place. Since the data stored on the memory bank 40 to be shut down (e.g., bank 2) is destructively copied and written into both the alternative DIMM address mapping and original DIMM address mapping, the data on the memory bank 40 to be shut down will remain accessible at that original DIMM address mapping until the memory bank 40 is actually shut down, at which the memory controller 36 may follow the alternative DIMM address mapping scheme. It should further be appreciated that this principal of remapping may be extended to any reduced number of memory banks 40.

In general, after transitioning from a memory mapping that includes more memory banks 40 to a memory mapping that includes fewer memory banks 40, such as from the three-bank memory mapping to a two-bank memory mapping, one or memory banks 40 may be inactive. However, in certain embodiments, such as the embodiment shown in FIGS. 24 and 25, the previously shut down memory bank 40 (e.g., bank 2) may be powered on briefly at certain times. In particular, data may be read from the DIMM address defined by a two-bank memory mapping, but may be written to the DIMM addresses defined by a three-bank memory mapping and the two-bank memory mapping. In this way, the third bank may be inactive at least some of the time (e.g., in self-refresh mode while not being written to), saving power. However, when the memory controller 36 switches back to the three-bank mapping, the copying of data back to the three-bank mapping of DIMM addresses will have already occurred, saving time. Such an embodiment may be particularly useful for asymmetric, read-dominated circumstances.

Figure 25:
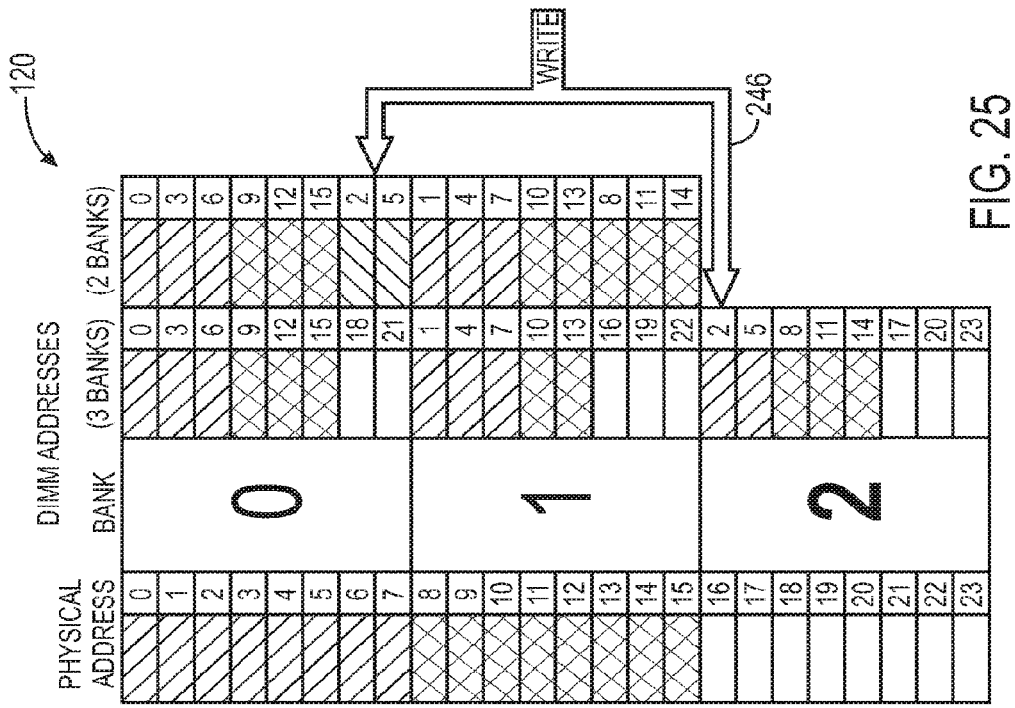
FIGS. 24 and 25 are schematic diagrams illustrating a process for reading from a two-bank memory mapping and writing to both a two-bank memory mapping and a three-bank memory mapping, respectively, in accordance with embodiments.
Figure 24:
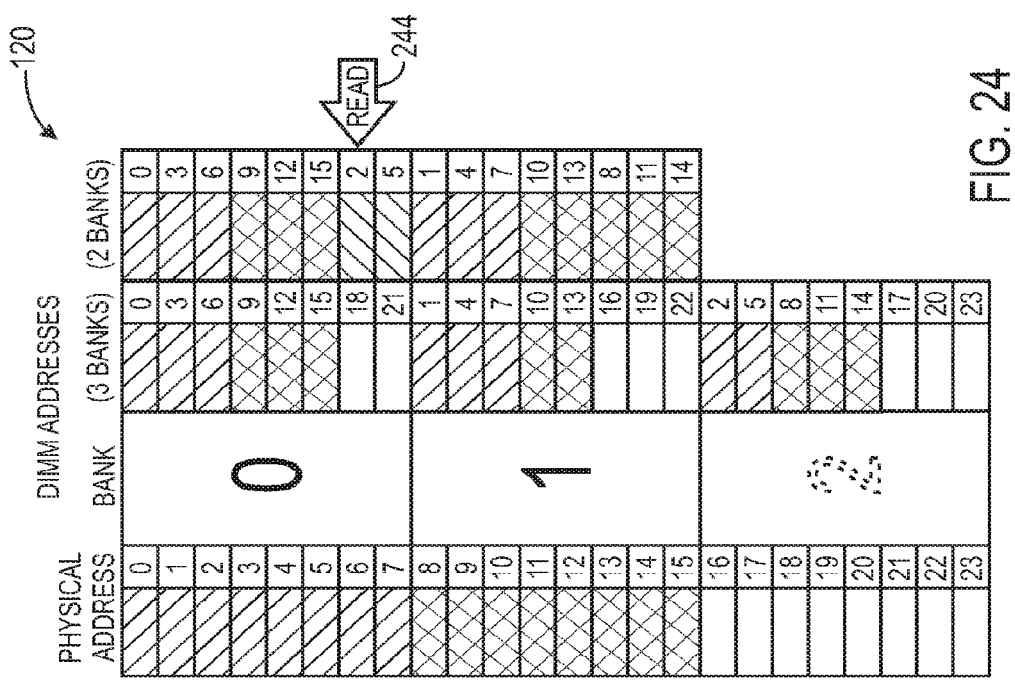

FIGS. 24 and 25 illustrate the alternative memory mapping 120, which is described in greater detail above with reference to FIG. 10. As such, this discussion is not reproduced here. In the embodiment shown in FIGS. 24 and 25, only bank 0 and bank 1 are active and the memory controller 36 is generally operating in a two-bank memory mapping. That is, in the example shown in FIG. 24, when the memory controller 36 opts to perform a read operation 244 to read the physical address "2," the memory controller only reads from the DIMM address "6" that maps to the physical address "2" in the two-bank memory mapping. The memory bank 2 may remain inactive when data is being read, saving power.

As shown in FIG. 25, when the memory controller 36 opts to write data to the memory banks 40, the memory controller 36 may write the data not only to the two-bank memory mapping, but also to the three-bank memory mapping. To do so, the memory bank 2 may be activated at least temporarily. In the example of FIG. 25, when the memory controller 36 opts to perform a write operation 246 to write the physical address "2," the memory controller may write not only to the DIMM address "6" on bank 0, but also to the DIMM address "16" on bank 2. If the memory controller 36 later transitions from the two-bank memory mapping to the three-bank memory mapping, the data from the DIMM address "6" need not be copied to the DIMM address "16," because the content of the physical address "2" already is located in the DIMM address "16."

Figure 13:
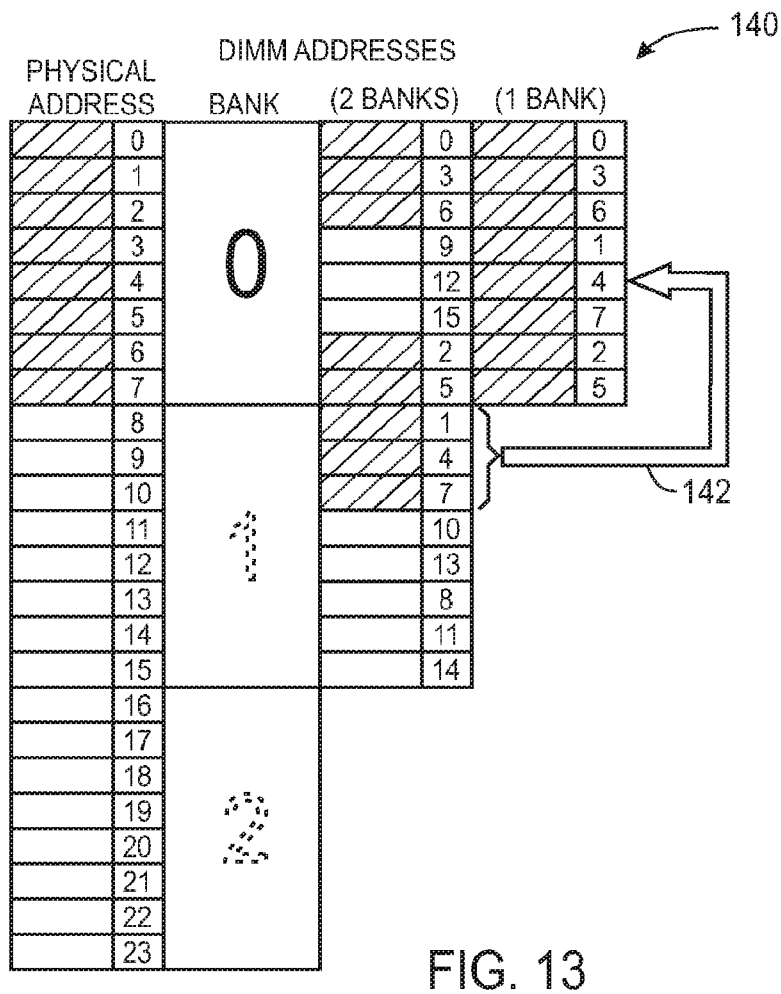
FIG. 13 is a schematic diagram illustrating a process for dynamic memory remapping from two banks of memory to one bank of memory, in accordance with an embodiment.

The process of dynamic memory remapping illustrated in FIG. 11 may be extended to reduce the amount of active memory further, as shown by a memory mapping diagram 140 of FIG. 13. The memory mapping diagram 140 illustrates a reduction in memory use from two memory banks 40A, 40B, and 40C to one memory bank 40. A column labeled "Physical Address" lists physical addresses. Physical addresses no longer in use (e.g., 8-24), which may be referred to as "inactive physical addresses," are illustrated with dashed formatting. A column labeled "Bank" lists the memory banks 40A, 40B, and 40C, each of which, for explanatory purposes only, hold eight DIMM addresses. In practice, it should be understood that the size of the memory banks 40 and their memory addresses may be much larger, and may represent any size chunk of memory that may be manipulated by the memory controller 36 (e.g., a cache line or page). The memory bank 40 that is to be shut down (e.g., bank 1) and the memory bank 40 previously shut down are illustrated with dashed formatting. A column labeled "DIMM Address (2 Banks)" illustrates the two-bank memory mapping scheme of FIG. 11. A column labeled "DIMM Address (1 Bank)" illustrates a remapping of the active physical addresses to certain DIMM addresses, when the number of active memory banks 40A, 40B, and 40C is reduced from two to one.

The memory controller 36 may carry out the memory mapping procedure outlined in the memory mapping diagram 140 in a similar manner to the methods discussed above with reference to FIGS. 10 and 12. The memory controller 36 may employ another alternative dynamic memory mapping function to remap the in-use physical addresses that have been mapped, in the two-bank mapping scheme, to DIMM addresses of the second memory bank 40, which will be shut down. The alternative memory mapping function may be any suitable function that maintains the mapping of the active physical addresses located on the memory bank 40 that will remain in use, while remapping DIMM addresses that map, in the two-bank scheme, to inactive physical addresses. In the example of the memory remapping diagram 140, the memory bank 0 is to remain active, and those of the active physical addresses (e.g., 0-7) mapped to DIMM addresses on bank 0 may not change. When a DIMM address the active memory bank 40 is mapped to an inactive physical address (e.g., 8-23), the memory controller 36 may remap these DIMM addresses on-the-fly. A second alternative memory mapping function for the remaining physical addresses may include the following relationships:

$$ALT\_DIMMAddr2\_1 = \text{If}(ALT\_DIMMAddr3\_2 < \text{ReducedMemory2}\_1, \quad (10),$$

Then ALT_DIMMAddr3_2,
Else If(BankReindex2_1<FirstBankEntries2_1,
Then FirstBankOffset2_1+Bank_Reindex2_1,
Else BankReindex2_1))

where:

$$\text{BankReindex2}\_1 = \text{If}(ALT\_DIMMAddr3\_2 < \text{ReducedMemory2}\_1, \quad (11)$$

Then −1,
Else ALT_DIMMAddr3_2−ReducedMemory2_1)

$$\text{FirstBankEntries2}\_1 = \text{Floor}(\text{BankSize}/\text{TotalBanks})+1 \quad (12); \text{ and}$$

$$\text{FirstBankOffset2}\_1 = \text{Floor}(\text{ReducedBanks2}\_1 * \text{BankSize}/\text{TotalBanks})+1 \quad (13).$$

In Equations (10)-(13) above, the variable ALT_DIMMAddr2_1 represents the alternative DIMM address mapping for the one-bank mapping scheme, the variable ALT_DIMMAddr3_2 represents the alternative DIMM address mapping for the two-bank mapping scheme, and ReducedMemory2_1 represents the newly reduced quantity of DIMM addresses available across the remaining active memory banks 40A, 40B, and 40C. The variable BankReindex2_1 is employed, in combination with the variables FirstBankEntries2_1, and FirstBankOffset2_1 to ascertain the alternative DIMM address mapping. Used in determining these variables, the variable BankSize represents the quantity of physical addresses per memory bank 40, the variable TotalBanks represents the total number of memory banks 40A, 40B, and 40C, and the variable ReducedBanks2_1 represents the number of memory banks 40A, 40B, and 40C remaining once the selected memory bank 40 (e.g., bank 1) is shut down.

As noted above with reference to FIG. 11, under the two-bank memory mapping scheme, the physical address "4" may still map to DIMM address "9." Based on Equations (10)-(13), as shown in FIG. 11, the physical address "4" may be remapped to DIMM address "4" in the one-bank memory mapping scheme. Similarly, the physical address "2," mapped to DIMM address "6" in the two-bank memory mapping scheme, may remain mapped to DIMM address "6" in the one-bank memory mapping scheme. After entering the one-bank memory remapping mode, the memory controller 36 may perform a copy function 142 to transfer the remaining active memory addresses to the remapped addresses in the 1-bank memory mapping scheme. The copy function 142 may take place in a manner similar to the copy function 122 discussed above.

Figure 14:
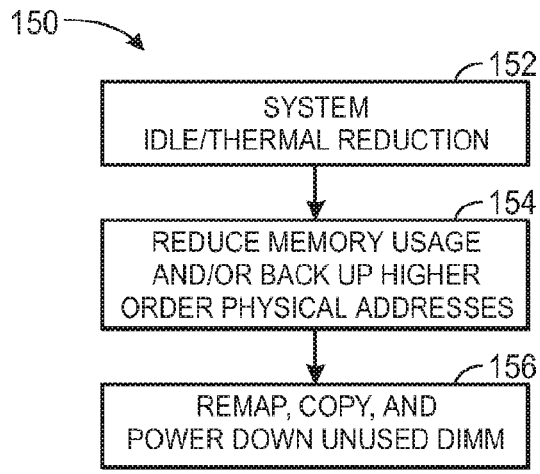
FIG. 14 is a flowchart describing an embodiment of a method for power management when the electronic device of FIG. 1 is idle or thermal constraints are considered.

The memory shut-down process may, in certain embodiments, be employed by the electronic device 10 for power management and/or thermal management under specific circumstances. In particular, FIG. 14 illustrates a flowchart 150 describing an embodiment of such a method for power management and/or thermal management. In a first block 152, the electronic device 10 may enter an idle state or may exceed a temperature threshold. In either case, the memory controller 36, the processor(s) 12, the OS running on the processor(s) 12, and/or software running on the OS may determine that power consumption should be reduced to save power and/or to prevent additional heat from being generated.

As such, in block 154, the OS may reduce memory usage using any of a variety of measures, which may include limiting the frame rate of graphics on the display 18, consolidating the working set of memory to fit into smaller areas of memory, and/or reducing unbound memory. Additionally or alternatively, the electronic device 10 may enter an idle or reduced-memory-usage state when the power source 26 switches from AC power to battery power, which may involve automatically reducing the video frame rate. In certain embodiments, the electronic device 10 may reduce memory usage by backing up memory data onto the nonvolatile storage 16, thereafter indicating that the higher order physical addresses to which the data corresponds is no longer in use.

Thereafter, in block 156, the memory controller 36 may perform one of the memory remapping procedures described above and shut down a portion of the memory 14 (e.g., bank 2), conserving power and/or reducing heat. In some embodiments, certain DIMM addresses on the memory bank 40 that is to be shut down (e.g., bank 2) may be put to use as cache before that memory bank 40 is shut down.

Figure 15:
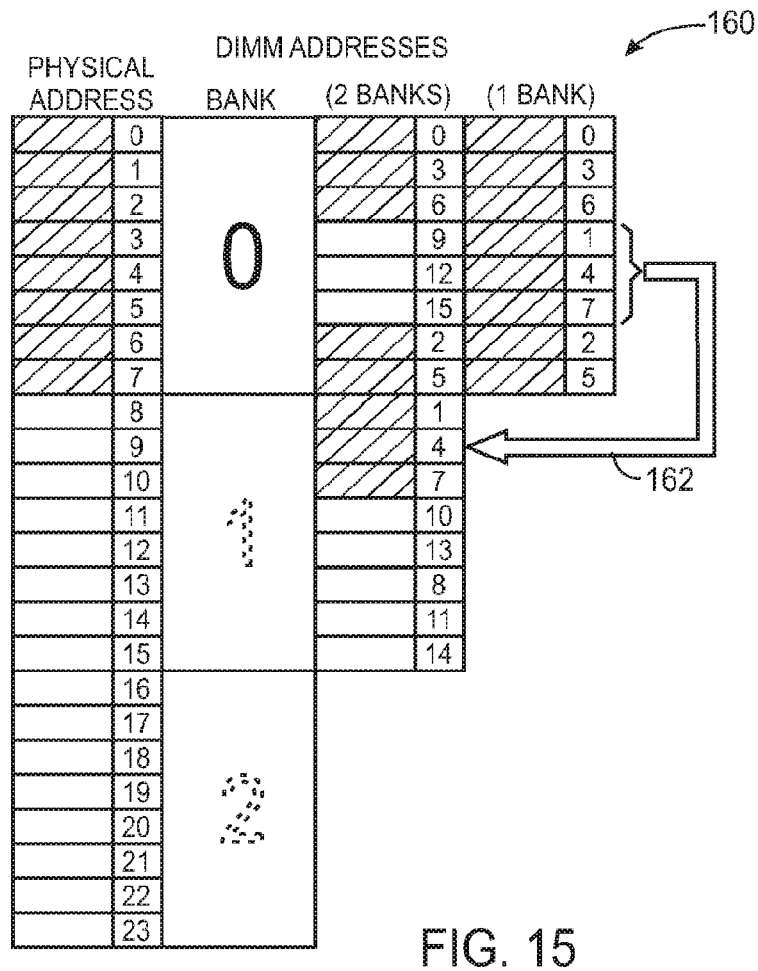
FIGS. 15 and 16 are schematic diagrams illustrating a process for dynamic memory remapping from one bank of memory to two banks of memory and from two banks of memory to three banks of memory, respectively, in accordance with embodiments.
Figure 16:
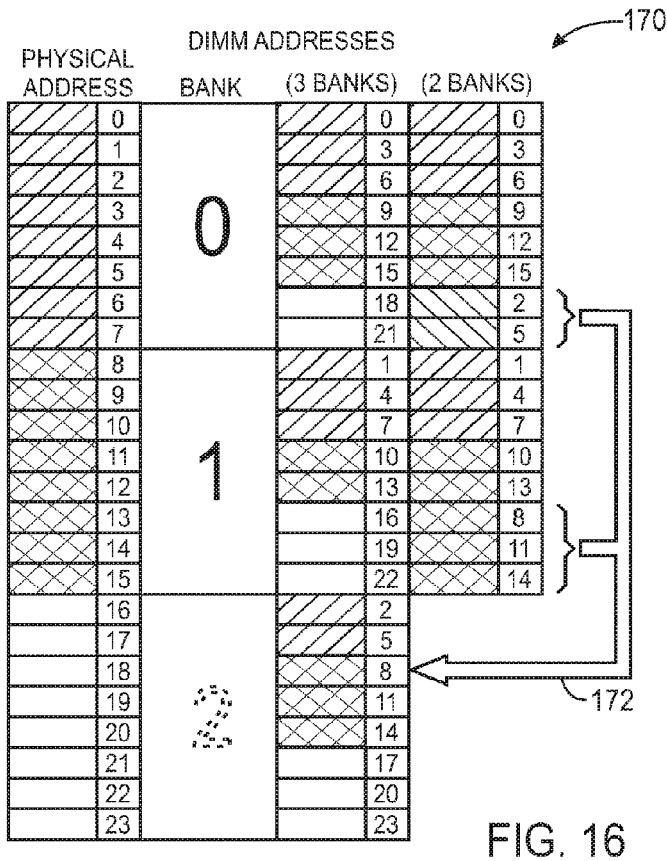

As discussed above with reference to FIG. 8, in addition to being deactivated to conserve power, the memory banks 40A, 40B, and 40C may also be reactivated to increase available memory. FIGS. 15 and 16 illustrate memory remapping diagrams for remapping, on-the-fly, from fewer memory banks 40A, 40B, and 40C to more memory banks 40A, 40B, and 40C. Turning first to FIG. 15, a memory remapping diagram 160 illustrates a process for transitioning to the two-bank memory mapping scheme from the one-bank memory mapping scheme. A column labeled "Physical Address" lists physical addresses. Physical addresses that are not in use (e.g., 16-23), which may be referred to as "inactive physical addresses," are illustrated with dashed formatting. A column labeled "Bank" lists the memory banks 40A, 40B, and 40C, which, for explanatory purposes only, each hold eight DIMM addresses. In practice, it should be understood that the size of the memory banks 40 and their memory addresses may be much larger, and may represent any size chunk of memory that may be manipulated by the memory controller 36 (e.g., a cache line or page). A column labeled "DIMM Address (2 Banks)" illustrates the two-bank memory mapping scheme, and a column labeled "DIMM Address (1 Bank)" illustrates the one-bank memory mapping scheme.

When the electronic device 10 transitions from the one-bank memory mapping scheme to the two-bank memory mapping scheme, the memory controller 36 may perform a copy function 162. The memory controller 36 may determine which DIMM addresses of bank 0 currently store data associated with physical addresses that, in the two-bank memory mapping scheme, map to DIMM addresses of bank 1. The memory controller 36 may read from these DIMM addresses and may write their contents onto at least the DIMM addresses associated with these physical addresses of the two-bank memory mapping scheme. In certain embodiments, the memory controller 36 may write such data onto both the DIMM addresses of the one-bank memory mapping scheme and of the two-bank memory mapping scheme.

Turning next to FIG. 16, a memory remapping diagram 170 illustrates a process for transitioning to the three-bank memory mapping scheme from the two-bank memory mapping scheme. A column labeled "Physical Address" lists physical addresses. A column labeled "Bank" lists the memory banks 40A, 40B, and 40C, which, for explanatory purposes only, each hold eight DIMM addresses. In practice, it should be understood that the size of the memory banks 40 and their memory addresses may be much larger, and may represent any size chunk of memory that may be manipulated by the memory controller 36 (e.g., a cache line or page). A column labeled "DIMM Address (3 Banks)" illustrates the three-bank memory mapping scheme, and a column labeled "DIMM Address (2 Banks)" illustrates the two-bank memory mapping scheme.

In the manner described above, when the electronic device 10 transitions from the two-bank memory mapping scheme to the three-bank memory mapping scheme, the memory controller 36 may perform a copy function 172. The memory controller 36 may determine which DIMM addresses of banks 0 and 1 currently store data associated with physical addresses that, in the three-bank memory mapping scheme, map to DIMM addresses of bank 2. The memory controller 36 may read from these DIMM addresses and may write their contents onto at least the DIMM addresses associated with these physical addresses of the three-bank memory mapping scheme. In certain embodiments, the memory controller 36 may write such data onto both the DIMM addresses associated with these physical addresses for both the two-bank memory mapping scheme and the three-bank memory mapping scheme.

Referring to both FIGS. 15 and 16, it should be recalled that in certain embodiments, the memory controller 36 may have swapped, rather than destructively copied, the data from the shut-down memory bank 40 (e.g., bank 2 or bank 1) into the newly remapped memory banks 0 and/or 1. For such embodiments, the memory bank 40 that was shut down may have been placed in a low-power self-refresh mode. As such, the shut-down memory bank 40 may have preserved the data stored in its physical addresses.

This data may be recovered when the shut-down memory bank 40 is reactivated and remapped (e.g., as according to FIG. 15 or 16). Rather than destructively copying certain physical addresses from hardware memory locations on, for example, memory bank 0 or 1 onto memory bank 1 or 2, such data may instead be swapped. Although performing such a swap function rather than a destructive copy function may involve additional memory buffer(s) to hold the physical addresses being swapped while the swap is taking place, swapping may enable the previously inaccessible data to be accessible again without need for restoring such data from nonvolatile storage 16.

Figure 17:
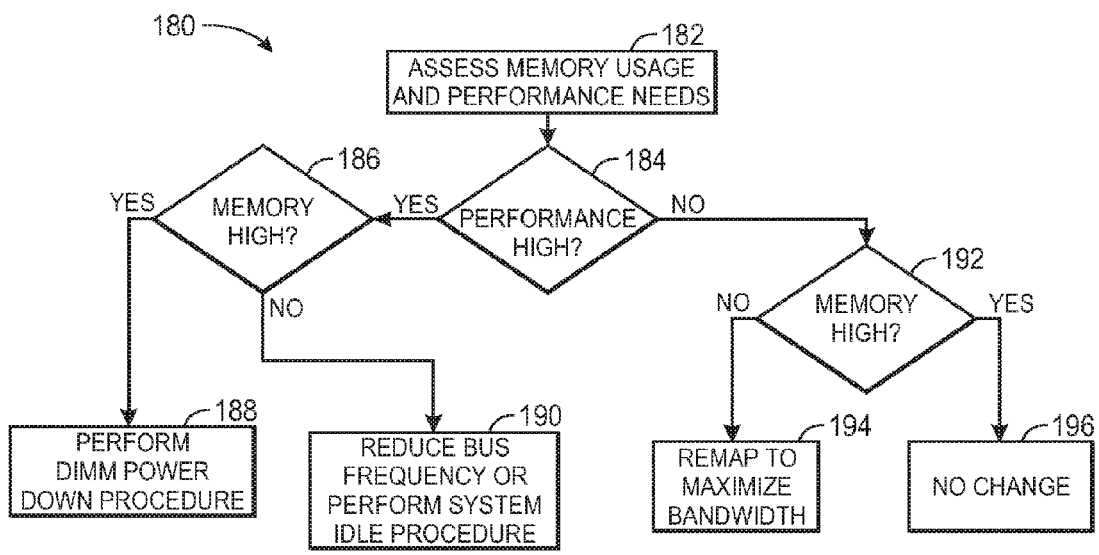
FIG. 17 is a flowchart describing an embodiment of a method for powering memory up or down depending on performance and memory considerations.

In some embodiments, the electronic device 10 may balance performance needs with memory usage needs to reduce the amount of power employed by the electronic device 10 in certain situations, as illustrated in a flowchart 180 of FIG. 17. In a first block 182, the memory controller 36, the processor(s) 12, the OS running on the processor(s) 12, and/or software running on the OS may assess memory usage and performance needs of the electronic device 10. This may be accomplished, for example, by monitoring the amount of memory currently in use and/or using performance counters tracked by the electronic device 10. As noted by decision blocks 184 and 186, if performance needs are low and memory needs are low, the electronic device 10 may undertake the remapping procedures to power down one or more of the memory banks 40A, 40B, and 40C according to the techniques described above in block 188. If the performance needs are low and the memory needs are high, the electronic device 10 may reduce the clock frequencies of the memory banks 40A, 40B, and 40C and/or the memory buses 42, 44, and 46 in block 190. Additionally or alternatively, the electronic device 10 may perform the system idle procedure described above with reference to FIG. 14 to reduce the amount of memory in use, before performing one of the remapping and memory shut-down techniques described above.

If, as indicated by decision blocks 184 and 192, the performance needs of the electronic device 10 are high but the memory usage is low, the memory 14 may be remapped and an additional memory bank 40A, 40B, or 40C may be reactivated, as shown by block 194. Though not all of the additional DIMM addresses may be used by the electronic device 10, by distributing the memory data across additional memory banks 40, the memory access bandwidth may be increased. The memory controller 36 may perform the remapping procedure in a manner such as described above with reference to FIGS. 15 and/or 16. If performance needs are high and memory usage is high, as indicated by decision blocks 184 and 192, all memory banks 40A, 40B, and 40C may be made active and in use, as shown by block 196.

Performance may be improved further by reducing the number of certain types of accesses to the memory banks 40. In particular, the DIMM addresses may be accessible via a row address selection (RAS), a column address selection (CAS), and a device selection (DEV). Since changing memory rows through changes in RAS may produce greater latency than changing memory columns through changes in CAS, on-the-fly memory remapping techniques may be employed that reduce the number of RAS changes and increase the number of CAS changes. Techniques for performing such memory remapping are discussed in greater detail below.

Figure 18:
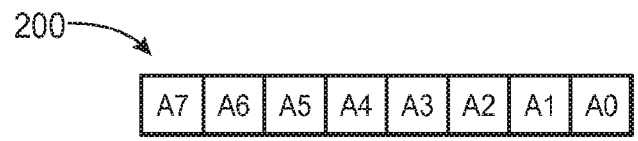
FIG. 18 is a schematic diagram of a cache line address to be mapped by the memory management system of FIG. 3.

To reduce row changes and unnecessary copying between memory banks 40 when one or more of the memory banks 40 is shut down, the memory controller 36 may remap certain address bits when certain memory is requested by the processor(s) 12. By way of example only, as illustrated in FIG. 18, a cache line address 200 that corresponds to an address space of 256 cache-line addresses may include 8 bits, labeled A0 to A7 in order of significance. It should be appreciated that, in practice, cache line addresses may be longer or shorter. Indeed, the present embodiments illustrated in FIGS. 18, 19A-C, 21A-E, and 22A-B are shown to include 8 bits to encode an address space of 256 cache lines for ease of explanation only. For a system that allows one or two memory banks 40 to be powered off, copying of data between DRAM devices should be reduced. For example, if one-half the memory of the memory banks 40 is to be powered down, then no more than one-half the memory should be relocated when the powering down occurs.

For example, the electronic device 10 may operate in 3 different configurations, in which either 1, 2, or 4 memory banks 40 remains powered, and where each configuration doubles the amount of memory available (e.g., each memory bank 40 is of equal size). In each configuration, unnecessary copying operations may be avoided by applying three different address-mapping schemes. These schemes may enable a high degree of memory bank 40 interleaving in each mode, while reducing row changes regardless of the mode.

Figure 19A:
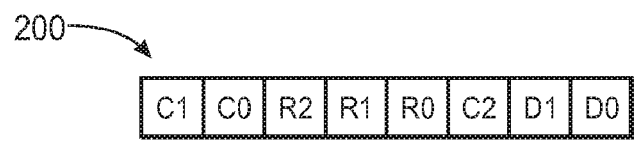
FIGS. 19A-C are schematic diagrams of cache line address remapping schemes employed by the memory management system of FIG. 3 when various segments of memory are powered down to one-half and one-fourth.
Figure 19B:
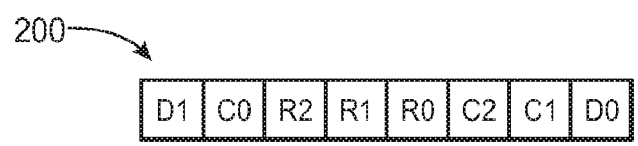
Figure 19C:
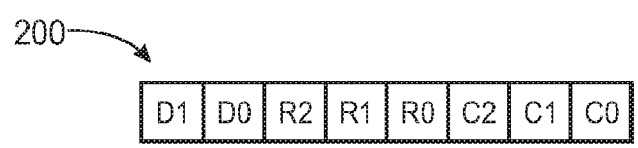

In one embodiment, the memory controller 36 may map the cache line address 200 in a manner that limits mapping changes to only two bits each time the configuration changes. FIGS. 19A-C represent mappings for a configuration starting with four memory banks 40 of equal size. By way of example only, as illustrated in FIGS. 19A-C, a cache line address 200 that corresponds to an address space of 256 cache-line addresses may include 8 bits, labeled A0 to A7 in order of significance. It should be appreciated that, in practice, cache line addresses may be longer or shorter. Indeed, the present embodiments illustrated in FIGS. 18, 19A-C, 21A-E, and 22A-B are shown to include 8 bits to encode an address space of 256 cache lines for ease of explanation only. Moreover, for ease of explanation only, the cache line address 200 of FIGS. 21A-C each map 64 cache addresses.

FIG. 19A represents a configuration when all four memory banks 40 are active, FIG. 19B represents a configuration when two of the memory banks 40 are active, and FIG. 19C represents a configuration when only one of the memory banks 40 is active. In FIGS. 19A-C, R0-R2 correspond to RAS bits, C0-C2 correspond to CAS bits, and D0 and D1 correspond to DEV bits. In certain embodiments, when all four memory banks 40 are active, the system memory map for the mode may map cache addresses 128-255 to the two fastest memory banks 40 and cache addresses 0-63 and 64-127 respectively to slower memory banks 40. When only two of four memory banks 40 of equal size are active, the system memory map for the mode may map cache addresses 0-63 and 64-127 respectively to slower memory banks 40, and when only one of the four memory banks 40 is active, the system memory map for the mode may map cache addresses 0-63 to the slowest of the memory banks 40.

As apparent from the mappings of FIGS. 19A-C, in each configuration change, one of the bits may be relocated to a portion of the system address-map that will be powered-down. Since the DEV bits D0 and D1 reside in the lower-ordered bits to achieve maximum memory bank 40 interleaving when all four memory banks 40 are active (FIG. 19A), and the powering-down of a memory bank 40 implies that that memory bank 40 may no longer be accessed, one of the DEV bits may be relocated from the lower-ordered bits to one of the higher-ordered bits that will no longer be accessed (FIG. 19B), in order to cause accesses to the disabled memory bank 40 not to occur.

To reduce row changes, the bit that should be exchanged with a DEV bit should be a CAS bit, implying that the CAS bit formerly used the higher-ordered bits of the cache address. Thus, to reduce copying, RAS must change more frequently during streaming with multiple memory banks 40 enabled that might otherwise be achieved, but under no circumstances should it change more frequently than when only a single memory bank 40 is enabled. Thus, in changing from the four-memory-bank configuration of FIG. 19A to the two-memory-bank configuration of FIG. 19B, cache line address bits A1 and A7 are swapped. In changing from the two-memory-bank configuration of FIG. 19B to the one-memory-bank configuration of FIG. 19C, cache line address bits A1 and A6 are swapped.

Accordingly, the mapping of FIGS. 19A-C result in the following translation between cache line addresses and system addresses, in which the notation ([#],[#],[#]) [#] corresponds to ([RAS], [CAS], [DEV]) [system address]:

TABLE 1

| Cache Address | four-memory-bank configuration (FIG. 19A) | two-memory-bank configuration (FIG. 19B) | one-memory-bank configuration (FIG. 19C) |
| --- | --- | --- | --- |
| 8 | (1, 0, 0) 8 | (1, 0, 0) 8 | (1, 0, 0) 8 |
| 9 | (1, 0, 1) 72 | (1, 0, 1) 72 | (1, 1, 0) 9 |
| 10 | (1, 0, 2) 136 | (1, 2, 0) 10 | (1, 2, 0) 10 |
| 11 | (1, 0, 3) 200 | (1, 2, 1) 74 | (1, 3, 0) 11 |
| 12 | (1, 4, 0) 12 | (1, 4, 0) 12 | (1, 4, 0) 12 |
| 13 | (1, 4, 1) 76 | (1, 4, 1) 76 | (1, 5, 0) 13 |
| 14 | (1, 4, 2) 140 | (1, 6, 0) 14 | (1, 6, 0) 14 |
| 15 | (1, 4, 3) 204 | (1, 6, 1) 78 | (1, 7, 0) 15 |

As seen in Table 1, regardless of the mode, there are eight accesses between row changes.

In some embodiments, the electronic device 10 may have only 3 memory banks 40, one memory bank 40 of which may have more memory than the remaining two memory banks 40. In some embodiments, a faster memory bank 40 may have the same capacity as the combined capacity of the two slower memory banks 40 (e.g., the fast memory bank 40 may have twice the capacity of each of the two remaining slow memory devices 40). For such embodiments, the above design strategy can still be employed by mapping DEV[0] (D0) to the additional CAS bit (e.g., CAS[3] (C3)) on the faster of the memory banks 40.

Figure 20:
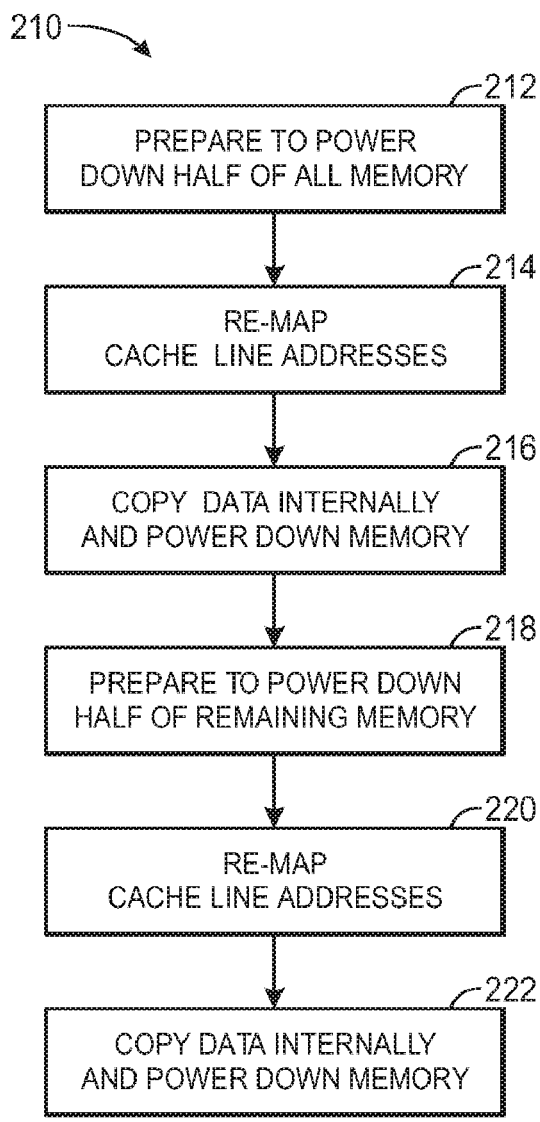
FIG. 20 is a flowchart describing an embodiment of a method for powering down memory that includes remapping cache line addresses in the manner illustrated by FIGS. 19A-C.

To carry out on-the-fly memory remapping when certain memory is to be powered down, the electronic device 10 may follow a process such as disclosed by a flowchart 210 of FIG. 20. The flowchart 210 may begin when the electronic device 10 is operating in a full memory usage mode (e.g., if four memory banks 40 are present, all four memory banks 40 may be active). Accordingly, when the flowchart 210 begins, the memory controller 36 may map the memory banks 40 according to a scheme such as illustrated in FIG. 19A. The electronic device 10 may prepare to power down half of the memory 14 available to the electronic device 10 (block 212) using any suitable technique, as discussed in greater detail above. Since faster memory banks 40 typically may consume greater amounts of power, the electronic device 10 generally may initially choose to power down the fastest memory bank(s) 40.

Prior to powering down the memory bank(s) 40, the memory controller 36 may remap the cache line addresses 200 (block 214) according to a scheme that only changes two bits of the cache line address 200 (e.g., as illustrated in FIG. 19B). Thereafter, the memory controller 36 may copy certain data from the memory bank(s) 40 that will be powered down to the memory banks 40 that will remain active, in the manners discussed above, before powering down the chosen memory bank(s) 40 (block 216).

When appropriate, the electronic device 10 may determine to power down half of the remaining memory 14 (block 218) using any suitable technique, such as discussed above. Since faster memory banks 40 typically may consume greater amounts of power, the electronic device 10 generally may choose to power down the faster of the remaining memory bank(s) 40. By way of example, if the electronic device 10 has a total of four memory banks 40 of equal size, only the slowest memory bank 40 may be selected to remain active. The memory controller 36 may next remap the cache line addresses 200 (block 220) according to a scheme that only changes two bits of the cache line address 200 (e.g., as illustrated in FIG. 19C). Thereafter, the memory controller 36 may copy certain data from the memory bank(s) 40 that will be powered down to the memory bank(s) 40 that will remain active, in the manners discussed above, before powering down the chosen memory bank(s) 40 (block 222).

In certain other embodiments, the electronic device 10 may employ a technique in which each mode adds or subtracts equal amounts of memory from system memory. For example, certain embodiments of the electronic device 10 may have 3 memory banks 40 of equal capacity. To reduce copying, only two address-mapping bits may be changed between modes in a manner similar to those discussed above.

Figure 21A:
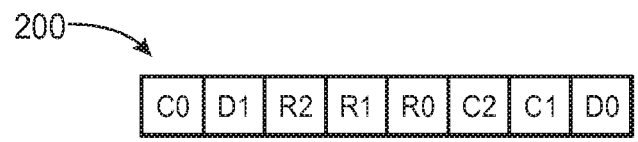
FIGS. 21A-E are schematic diagrams of cache line address remapping schemes employed by the memory management system of FIG. 3 when various segments of memory are powered down to two-thirds and one-third.
Figure 21B:
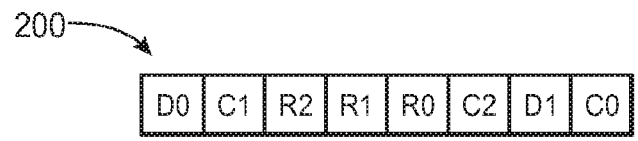
Figure 21C:
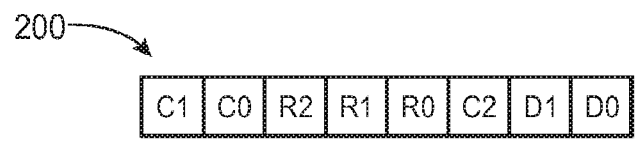
Figure 21D:
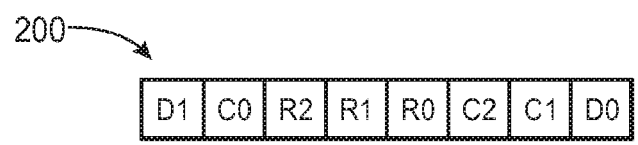
Figure 21E:
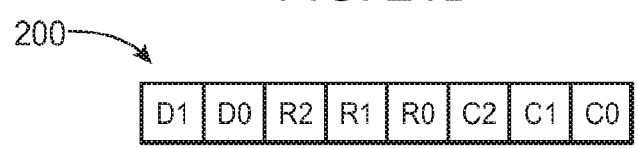
Figure 22A:
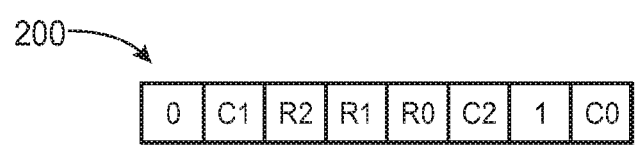
FIGS. 22A-B are schematic diagrams of cache line address illustrating that the cache line address remapping schemes of FIGS. 21A-E involve only two bit changes.
Figure 22B:
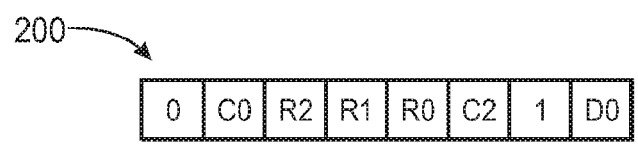

For example, FIGS. 21A-E represent mappings for a configuration starting with three memory banks 40 of equal size. In particular, FIGS. 21A-C represent certain variations of a configuration when all three memory banks 40 are active, FIG. 21D represents a configuration when two of the memory banks 40 are active, and FIG. 21E represents a configuration when only one of the memory banks 40 is active. In FIGS. 21A-E, R0-R2 correspond to RAS bits, C0-C2 correspond to CAS bits, and D0 and D1 correspond to DEV bits. By way of example only, as illustrated in FIGS. 21A-E, a cache line address 200 that corresponds to an address space of 256 cache-line addresses may include 8 bits, labeled A0 to A7 in order of significance. It should be appreciated that, in practice, cache line addresses may be longer or shorter. Indeed, the present embodiments illustrated in FIGS. 18, 19A-C, 21A-E, and 22A-B are shown to include 8 bits to encode an address space of 256 cache lines for ease of explanation only. Moreover, for ease of explanation only, the cache line address 200 of FIGS. 21A-C each map 64 cache addresses. That is, in certain embodiments, when all three memory banks 40 are active, the system memory map for the mode may map cache addresses 128-191 to the fastest memory bank 40 and cache addresses 0-63 and 64-127 respectively to slower memory banks 40. When only two of three memory banks 40 of equal size are active, the system memory map for the mode may map cache addresses 0-63 and 64-127 respectively to slower memory banks 40, and when only one of the three memory banks 40 is active, the system memory map for the mode may map cache addresses 0-63 to the slowest of the memory banks 40.

Unlike the configuration of FIGS. 19A-C, in which a single mapping (FIG. 19A) applies for all of the cache addresses in the four-memory-bank configuration, when all three memory banks 40 are active, a different mapping applies depending on the states of certain cache line address 200 bits. In particular, when all three memory banks 40 are active, a mapping according to FIG. 21A may be applied when cache line address 200 bits A7=1 and A1=1; a mapping according to FIG. 21B may be applied when cache line address 200 bits A7=0 and A1=1; and a mapping according to FIG. 21C may be applied when cache line address 200 bits A7=0 and A1=0.

At first glance, it may appear that the rule of only changing the mappings of two cache line address 200 bits during a mode change has been violated. As shown in FIGS. 21B and 21D, when switching between the three-memory-bank configuration and the two-memory-bank configuration when A7=0 and A1=1, the mappings of A7, A6, A2, and A1 have all changed. However, since the values of A7 and A1 are known (e.g., A7=0 and A1=1), fixed values may be substituted as respectively shown in FIGS. 22A and 22B. From FIGS. 22A and 22B, it may be seen that only A6 and A0 have changed mappings between the three-memory-bank configuration and the two-memory-bank configuration.

The mapping of FIGS. 21A-E result in the following translation between cache line addresses and system addresses, in which the notation ([#],[#],[#]) [#] corresponds to ([RAS], [CAS], [DEV]) [system address]:

TABLE 2

| Cache Address | three-memory-bank configuration (FIGS. 21A-E) | two-memory-bank configuration (FIG. 21B) | one-memory-bank configuration (FIG. 21C) |
| --- | --- | --- | --- |
| 8  | (1, 0, 0) 8    | (1, 0, 0) 8   | (1, 0, 0) 8  |
| 9  | (1, 0, 1) 72   | (1, 0, 1) 72  | (1, 1, 0) 9  |
| 10 | (1, 0, 2) 136  | (1, 2, 0) 10  | (1, 2, 0) 10 |
| 11 | (1, 1, 2) 137  | (1, 2, 1) 74  | (1, 3, 0) 11 |
| 12 | (1, 4, 0) 12   | (1, 4, 0) 12  | (1, 4, 0) 12 |
| 13 | (1, 4, 1) 76   | (1, 4, 1) 76  | (1, 5, 0) 13 |
| 14 | (1, 4, 2) 140  | (1, 6, 0) 14  | (1, 6, 0) 14 |
| 15 | (1, 5, 2) 141  | (1, 6, 1) 78  | (1, 7, 0) 15 |

In Table 2, as in Table 1 above, regardless of the mode, there are eight accesses between row changes.

Figure 23:
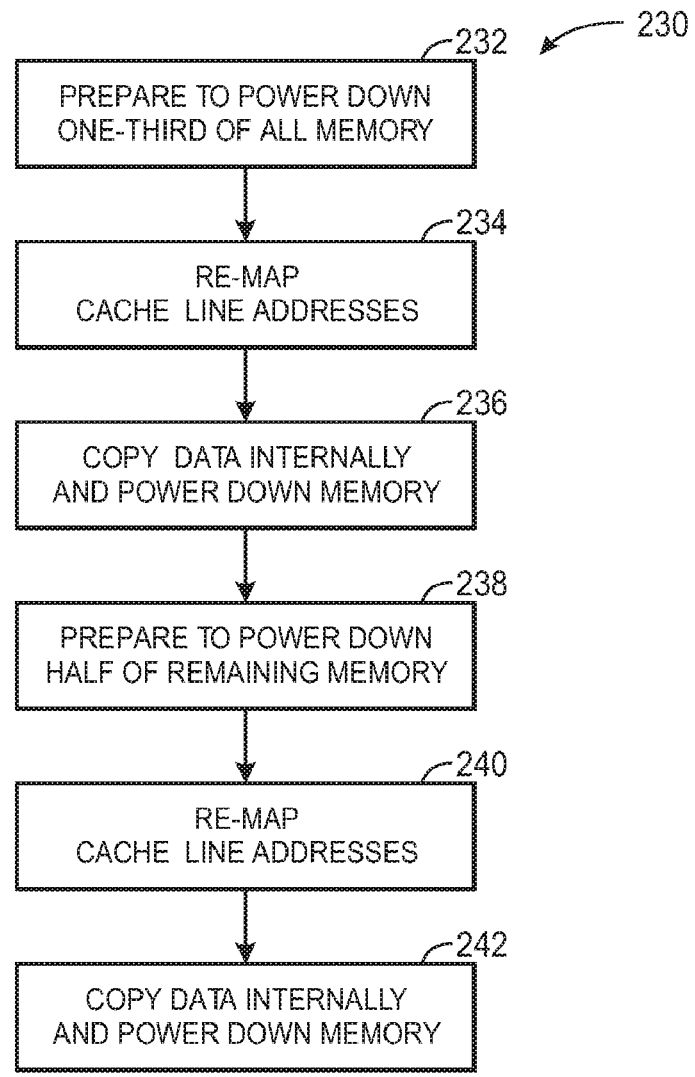
FIG. 23 is a flowchart describing an embodiment of a method for powering down memory that includes remapping cache line addresses in the manner illustrated by FIGS. 21A-E.

To carry out on-the-fly memory remapping when memory is to be powered down in one-third increments, the electronic device 10 may follow a process such as disclosed by a flowchart 230 of FIG. 23. The flowchart 230 may begin when the electronic device 10 is operating in a full memory usage mode (e.g., if three memory banks 40 of equal size are present, all three memory banks 40 may be active). Accordingly, when the flowchart 230 begins, the memory controller 36 may map the memory banks 40 according to a scheme such as illustrated in FIGS. 21A-C, depending on the state of cache line address 200 bits A7 and A1. The electronic device 10 may prepare to power down one-third of the memory 14 available to the electronic device 10 (block 232) using any suitable technique, as discussed in greater detail above. Since faster memory banks 40 typically may consume greater amounts of power, the electronic device 10 generally may initially choose to power down the fastest memory bank(s) 40.

Prior to powering down the memory bank(s) 40, the memory controller 36 may remap the cache line addresses 200 (block 234) according to a scheme that only changes two bits of the cache line address 200 (e.g., as illustrated in FIG. 21D and as demonstrated above). Thereafter, the memory controller 36 may copy certain data from the memory bank(s) 40 that will be powered down to the memory banks 40 that will remain active, in the manners discussed above, before powering down the chosen memory bank(s) 40 (block 236).

When appropriate, the electronic device 10 may determine to power down half of the remaining memory 14 such that only one-third of the total memory 14 remains (block 218) using any suitable technique, such as those discussed above. Since faster memory banks 40 typically may consume greater amounts of power, the electronic device 10 generally may choose to power down the faster of the remaining memory bank(s) 40. By way of example, if the electronic device 10 has a total of three memory banks 40 of equal size, only the slowest memory bank 40 may be selected to remain active. The memory controller 36 may next remap the cache line addresses 200 (block 220) according to a scheme that only changes two bits of the cache line address 200 (e.g., as illustrated in FIG. 21E). Thereafter, the memory controller 36 may copy certain data from the memory bank(s) 40 that will be powered down to the memory bank(s) 40 that will remain active, in the manners discussed above, before powering down the chosen memory bank(s) 40 (block 222).

It should be understood that the specific embodiments described above have been shown by way of example, and that these embodiments may be susceptible to various modifications and alternative forms. For example, the techniques described herein by way of example may similarly apply to various other quantities of memory. That is, the techniques described above may also be applied to perform on-the-fly memory mapping and re-mapping from four or more memory banks 40 to three or fewer. Moreover, it should be appreciated that in addition to individually controllable memory banks 40, any memory of any size that may be separately deactivated (in which portions of the memory may be deactivated while other portions remain active) may be employed. Additionally, for example, when transitioning between memory mapping modes, copying may be completed by the memory controller 36 in a manner that is hidden from the operating system (OS) or software of the electronic device 10, or copying may be completed in manner that is controlled by the OS or software, provided each copy is atomic (e.g., a read from a first DIMM address at a first memory mapping may be immediately followed by writes to DIMM addresses of both the first and second memory mapping). It should be further understood that the claims are not intended to be limited to the particular forms disclosed, but rather to cover all modifications, equivalents, and alternatives falling within the spirit and scope of this disclosure.

The invention claimed is:

1. A method, comprising:
monitoring a level of usage of a memory coupled to one or more processors, wherein the memory includes a plurality of portions;
selecting a given portion of the plurality of portions of the memory responsive to determining the level of usage of the memory has remained below a first threshold level for a first predetermined amount of time;
remapping addresses associated with the given portion of the plurality of portions to addresses associated with one or more unselected portions of the plurality of portions responsive to selecting the given portion;
copying data from the given portion of the plurality of portions to the one or more unselected portions using the remapped addresses; and
deactivating the given portion of the plurality of portions.

2. The method of claim 1, further comprising:
reactivating the given portion of the plurality of portions of the memory responsive to determining the level of usage of the memory is greater than a second threshold level;
mapping the remapped addresses associated with the one or more unselected portions of the plurality of portions to the addresses associated with the given portion of the plurality of portions responsive to reactivating the given portion; and
copying data to the given portion of the plurality of portions from the remapped addresses associated with the one or more unselected portions.

3. The method of claim 2, further comprising determining the level of usage of the memory has remained above the second threshold level for a second predetermined amount of time.

4. The method of claim 1, wherein monitoring the level of usage of the memory includes monitoring at least one operational parameter of the one or more processors.

5. The method of claim 1, wherein monitoring the level of usage of the memory includes monitoring a level of activity of the one or more processors using one or more counters.

6. The method of claim 1, wherein monitoring the level of usage of the memory includes determining if software applications with high rates of memory usage are executing on one or more of the one or more processors.

7. The method of claim 1, wherein monitoring the level of usage of the memory includes tracking memory usage patterns, wherein tracking the memory usage patterns include correlating memory usage to a time of day and a day of a week.

8. A system comprising:
a memory including a plurality of portions; and
one or more processors, coupled to the memory, wherein the one or more processors are configured to:
execute one or more software applications;
monitor a level of usage in the memory; and
determine the level of usage in the memory has remained below a first threshold level for a first predetermined amount of time;
wherein the memory is configured to:
select a given portion of the plurality of portions responsive to a determination that the level of usage is less than a first threshold level;
remap addresses associated with the given portion to addresses associated with one or more unselected portions of the plurality of portions responsive to selecting the given portion;
copy data from the given portion of the plurality of portions to the one or more unselected portions using the remapped addresses; and
deactivate the given portion of the plurality of portions.

9. The system of claim 8, wherein the one or more processors are further configured to determine the level of usage in the memory is greater than a second threshold level; and
wherein the memory controller is further configured to:
reactivate the given portion of the plurality of portions of the memory responsive to the determination the level of usage in the memory is greater than the second threshold level;
map the remapped addresses associated with the one or more unselected portions of the plurality of portions to the addresses associated with the given portion of the plurality of portions responsive to reactivating the given portion; and
copy data to the given portion of the plurality of portions from the remapped addresses associated with the one or more unselected portions.

10. The system of claim 9, wherein the one or more processors are further configured to determine the level of usage in the memory has remained above the second threshold level for a second predetermined amount of time.

11. The system of claim 8, wherein to monitor the level of usage in the memory the one or more processors are further configured to monitor at least one operational parameter of the one or more processors.

12. The system of claim 8, wherein to monitor the level of usage in the memory the one or more processors are further configured to monitor a number of memory stalls by the one or more processors.

13. The system of claim 8, wherein to monitor the level of usage in the memory the one or more processors are further configured to track one or more preferences selected by a user.

14. The system of claim 8, wherein to monitor the level of usage in the memory the one or more processors are further configured to determine an expected memory usage, wherein the expected memory usage is dependent upon a memory consumption history of launched software applications.

15. An apparatus comprising:
a memory including a plurality of portions;
an interface coupled to one or more processors; and
a memory controller, coupled to the memory and to the interface, wherein the memory controller is configured to:
monitor a level of usage in the memory;
select a given portion of the plurality of portions responsive to determining the level of usage in the memory has remained below a first threshold level for a first predetermined amount of time;
remap addresses associated with the given portion of the plurality of portions to addresses associated with one or more unselected portions of the plurality of portions responsive to selecting the given portion;
copy data from the given portion of the plurality of portions to the one or more unselected portions using the remapped addresses; and
deactivate the given portion of the plurality of portions.

16. The apparatus of claim 15, wherein the memory controller is further configured to:
reactivate the given portion of the plurality of portions of the memory responsive to a determination the level of usage in the memory is greater than a second threshold level;

map the remapped addresses associated with the one or more unselected portions of the plurality of portions to the addresses associated with the given portion of the plurality of portions responsive to reactivating the given portion; and copy data to the given portion of the plurality of portions from the remapped addresses associated with the one or more unselected portions.

17. The apparatus of claim 16, wherein the memory controller is further configured to determine the level of usage in the memory has remained above the second threshold level for a second predetermined amount of time.

18. The apparatus of claim 15, wherein to monitor the level of usage in the memory the memory controller is further configured to track an operating temperature of the memory.

19. The apparatus of claim 15, wherein to monitor the level of usage in the memory the memory controller is further configured to track a frequency of paging activities associated with the memory.

20. The apparatus of claim 15, wherein to deactivate the given portion of the plurality of portions, the memory controller is further configured to reduce a level of a supply voltage coupled to the given portion.

* * * * *